United States Patent
Jain et al.

(10) Patent No.: US 10,250,547 B1
(45) Date of Patent: Apr. 2, 2019

(54) TREND DETECTION FOR CONTENT TARGETING USING AN INFORMATION DISTRIBUTION SYSTEM

(71) Applicant: Twitter, Inc., San Francisco, CA (US)

(72) Inventors: Dinkar Jain, Stanford, CA (US); Mu Lin, Redwood Shores, CA (US); David Hotchkiss, San Francisco, CA (US)

(73) Assignee: TWITTER, INC., San Francisco, CA (US)

( * ) Notice: Subject to any disclaimer, the term of this patent is extended or adjusted under 35 U.S.C. 154(b) by 297 days.

(21) Appl. No.: 15/200,873

(22) Filed: Jul. 1, 2016

Related U.S. Application Data

(60) Provisional application No. 62/188,572, filed on Jul. 3, 2015.

(51) Int. Cl.
| | | |
|---|---|---|
| G06F 17/27 | (2006.01) | |
| G06Q 30/02 | (2012.01) | |
| G06Q 50/00 | (2012.01) | |
| H04L 12/58 | (2006.01) | |
| H04L 29/08 | (2006.01) | |

(52) U.S. Cl.
CPC ............ H04L 51/32 (2013.01); G06Q 50/01 (2013.01); H04L 67/22 (2013.01); H04L 67/306 (2013.01); *G06F 17/2785* (2013.01); *G06Q 30/0201* (2013.01)

(58) Field of Classification Search
CPC .... G06Q 50/01; G06Q 30/02; G06Q 30/0254; G06Q 30/0277; G06Q 30/0201; H04L 51/32; H04L 67/22; H04L 41/509; H04L 65/60; G06F 17/2785
See application file for complete search history.

(56) References Cited

U.S. PATENT DOCUMENTS

| | | | | |
|---|---|---|---|---|
| 8,972,379 | B1* | 3/2015 | Grieselhuber | G06F 17/3089 707/713 |
| 9,898,748 | B1* | 2/2018 | Taylor | G06Q 30/0201 |
| 2012/0272160 | A1* | 10/2012 | Spivack | G06Q 10/10 715/752 |

(Continued)

OTHER PUBLICATIONS

Zubiaga et al. "Real-Time Classification of Twitter Trends" Journal of the Association for Information Science and Technology, 66(3):462-473, 2014 (Year: 2014).*

(Continued)

*Primary Examiner* — David R Lazaro
(74) *Attorney, Agent, or Firm* — Shumaker & Sieffert, P.A.

(57) ABSTRACT

In some examples, a method includes receiving, from one or more client devices, a stream of messages composed by one or more users of the one or more client devices, wherein each of the messages includes a particular hashtag, determining, using a set of metrics that are based at least in part on the messages, a trending score that represents a magnitude of a trend for the particular hashtag, in response to determining that the trending score satisfies a threshold, sending, to a content provider system, a set of demographic data that describes one or more of the users who associated with the particular hashtag, and, in response to receiving, from the content provider system, targeted content that is based at least in part on the particular hashtag and the set of demographic data, sending, for display at the one or more of the one or more client devices, the targeted content.

23 Claims, 5 Drawing Sheets

(56) References Cited

U.S. PATENT DOCUMENTS

| | | | | |
|---|---|---|---|---|
| 2014/0040387 A1* | 2/2014 | Spivack | ............. | G06F 17/3053 709/206 |
| 2014/0164137 A1* | 6/2014 | Mathur | ............. | G06Q 30/0275 705/14.66 |
| 2015/0046436 A1* | 2/2015 | Li | ............. | G06F 17/3053 707/723 |
| 2015/0081505 A1* | 3/2015 | Co | ............. | G06Q 40/04 705/37 |
| 2015/0127418 A1* | 5/2015 | Piepgrass | ............. | G06Q 30/0201 705/7.29 |
| 2015/0149539 A1* | 5/2015 | Shukla | ............. | H04L 67/22 709/204 |
| 2015/0161633 A1* | 6/2015 | Adams | ............. | G06Q 30/0204 705/7.33 |
| 2015/0271326 A1* | 9/2015 | Matlock | ............. | H04M 3/436 705/14.58 |
| 2015/0310018 A1* | 10/2015 | Fan | ............. | G06F 17/30 707/734 |
| 2015/0332317 A1* | 11/2015 | Cui | ............. | G06Q 30/0247 705/14.46 |
| 2016/0224686 A1* | 8/2016 | Ramanathan | ............. | G06F 17/30958 |
| 2016/0359993 A1* | 12/2016 | Hendrickson | ............. | H04L 67/22 |
| 2017/0286429 A1* | 10/2017 | Lange | ............. | H04L 67/22 |
| 2017/0308927 A1* | 10/2017 | Woods | ............. | G06Q 30/0254 |
| 2017/0337640 A1* | 11/2017 | Subramanian | ............. | G06F 17/2785 |

OTHER PUBLICATIONS

Story et. al. "Discovering trending topics on twitter via retweets." cs. uiowa. edu/~ jwikstr/ (2011) (Year: 2011).*

Mehrotra et al. "Improving LDA Topic Models for Microblogs via Tweet Pooling and Automatic Labeling" SIGIR'13, Jul. 28-Aug. 1, 2013 (Year: 2013).*

Muntean et al. "Exploring the Meaning behind Twitter Hashtags through Clustering" BIS (Workshops), vol. 127 of Lecture Notes in Business Information Processing. Springer, pp. 231-242, 2012 (Year: 2012).*

\* cited by examiner

TREND DETECTION FOR CONTENT TARGETING USING AN INFORMATION DISTRIBUTION SYSTEM

This application claims the benefit of U.S. Provisional Application No. 62/188,572 filed Jul. 3, 2015, the entire contents of which is hereby incorporated by reference.

BACKGROUND

Computing devices, such as smartphones, laptops, and desktop computers, have enabled users to generate, distribute, and consume user-generated content across a broad range of topics and geographic areas. Information distributions platforms may allow users to identify specific topics of interest and share information related to the topics in a real- or near real-time manner. For example, an information distribution platform may allow users to label user-generated content with tags, such as hashtags, that identify or otherwise associate a particular topic with the user-generated content. In this way, information distribution platforms may allow users to search for user-generated content associated with a particular topic based at least in part on a hashtag. In some instances, a particular topic may grow rapidly in popularity over a short period of time due to user interest in the topic. Although, a particular topic may grow rapidly in popularity over a short period of time some information distribution platforms may not detect or otherwise utilize the discovery of trends to improve users' experiences with such information distribution platforms.

SUMMARY

In some examples, a method includes receiving, by an information distribution system and from one or more client devices, a stream of messages composed by one or more users of the one or more client devices, wherein each of the messages includes a particular hashtag, and determining, by the information distribution system and using a set of metrics that are based at least in part on the messages, a trending score that represents a magnitude of a trend for the particular hashtag. In response to determining that the trending score satisfies a threshold, the method further includes sending, by the information distribution system and to a content provider system, a set of demographic data that describes one or more of the users who associated with the particular hashtag, and, in response to receiving, from the content provider system, targeted content that is based at least in part on the particular hashtag and the set of demographic data, sending, by the information distribution system and for display at the one or more of the one or more client devices, the targeted content.

In some examples, a computing device includes at least one processor and at least one non-transitory computer-readable storage medium storing instructions that are executable by the at least one processor to: receive, from one or more client devices, a stream of messages composed by one or more users of the one or more client devices, wherein each of the messages includes a particular hashtag; determine, using a set of metrics that are based at least in part on the messages, a trending score that represents a magnitude of a trend for the particular hashtag; in response to determining that the trending score satisfies a threshold, send, to a content provider system, a set of demographic data that describes one or more of the users who associated with the particular hashtag; and in response to receiving, from the content provider system, targeted content that is based at least in part on the particular hashtag and the set of demographic data, send, for display at the one or more of the one or more client devices, the targeted content.

In some examples, a non-transitory computer-readable storage medium is encoded with instructions that, when executed, cause at least one processor of a computing device to: receive, from one or more client devices, a stream of messages composed by one or more users of the one or more client devices, wherein each of the messages includes a particular hashtag; determine, using a set of metrics that are based at least in part on the messages, a trending score that represents a magnitude of a trend for the particular hashtag; in response to determining that the trending score satisfies a threshold, send, to a content provider system, a set of demographic data that describes one or more of the users who associated with the particular hashtag; and in response to receiving, from the content provider system, targeted content that is based at least in part on the particular hashtag and the set of demographic data, send, for display at the one or more of the one or more client devices, the targeted content.

The details of one or more examples are set forth in the accompanying drawings and the description below. Other features, objects, and advantages of the disclosure will be apparent from the description and drawings, and from the claims.

DETAILED DESCRIPTION

Techniques of the disclosure are directed to detecting trends in user-generated content based at least in part on one or more hashtags and providing content providers, such as advertisers, with timely and accurate demographic data about users associated with specific trends that are growing rapidly or are predicted to grow rapidly. To detect a magnitude of a trend in user-generated content (e.g., a popularity of a particular topic or a number of impressions made by a particular word or phrase in the user-generated content), techniques of the disclosure may analyze a set of metrics that collectively indicate the magnitude of a trend. Example metrics may include, but are not limited to, a velocity of content generated by users with a particular hashtag (e.g., an amount of content generated over a particular amount of time), an acceleration of content generated by users with a particular hashtag (e.g., a rate at which the amount of content generated is increasing), the presence of media (e.g., videos, pictures, graphics interchange format images (GIFs)) in messages that include the hashtag, or a number of other users mentioned in messages with the hashtag. Using the set of metrics, techniques of the disclosure may identify a magnitude of a trend, and for trends that are growing rapidly or are predicted to grow rapidly, the techniques may select demographic data for users who generate, read, or follow messages that correspond to the trend. Techniques of the disclosure may provide content providers with the selected demographic data, such that the content providers can generate targeted content for users associated with the trend. The content providers may then bid or otherwise compete to distribute the targeted content to client devices of the one or more users associated with trend.

Rather than merely analyzing information regarding the user's profile, analyzing the content of user-generated content enables content providers to deliver targeted content in a more effective manner. For instance, a user may not have an immediate interest in topics included in various aspects of their profile, such as other users that the particular user is following or selected interests from the user's profile. However, if a user generates content regarding a specific topic, a system may reasonably determine that the user has an immediate interest in that specific topic. As such, a content provider that could profit from sending targeted content to that user regarding the specific topic may benefit from a system that analyzes such trends rather than simply analyzing the user's general profile.

Figure 1:
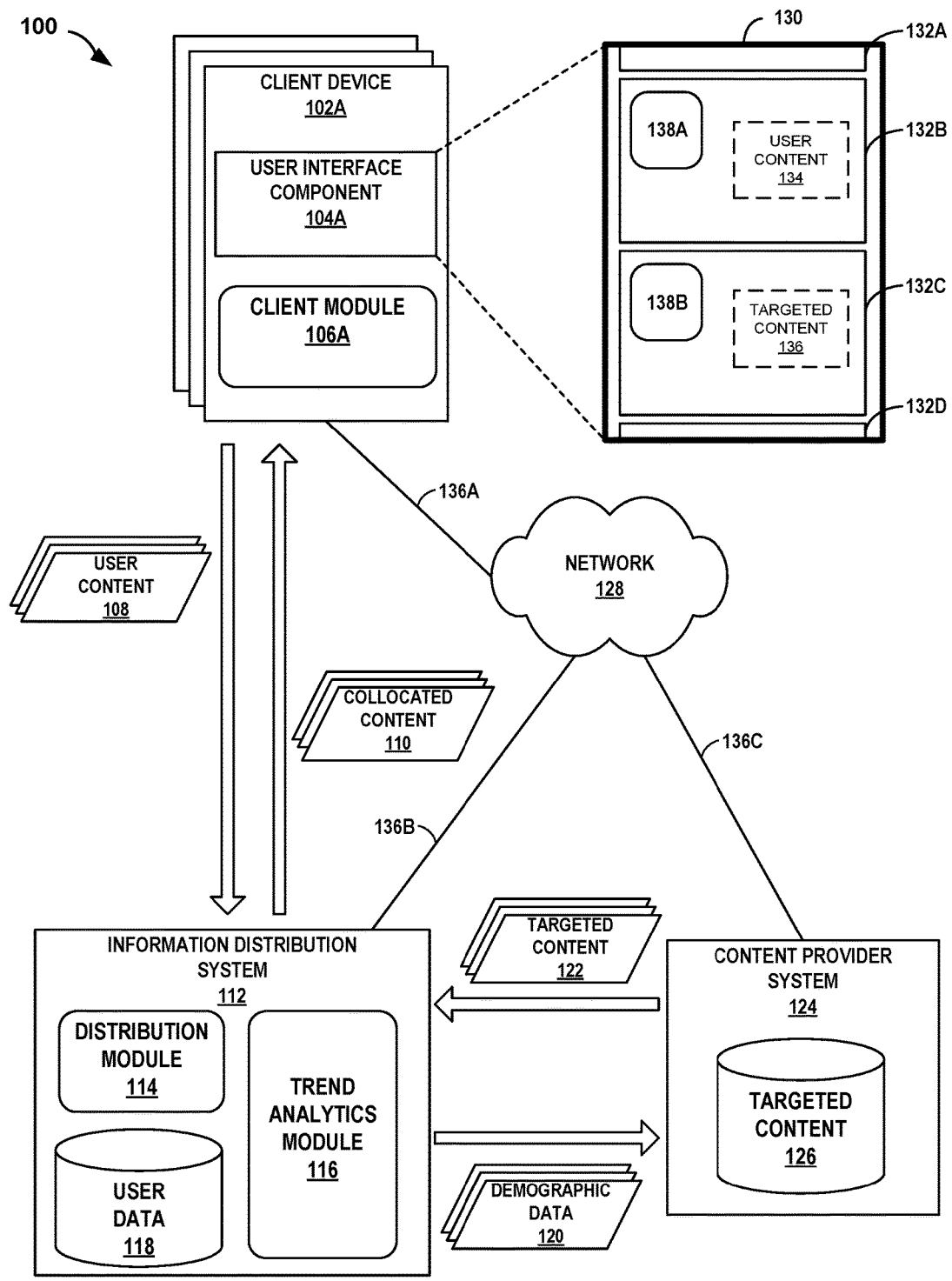
FIG. 1 is a conceptual diagram illustrating a system that is configured to detect magnitudes of trends in user-generated content and to facilitate the delivery of targeted content based at least in part on demographic data of the one or more users associated with the user-generated content, in accordance with one or more aspects of the present disclosure.

FIG. 1 is a conceptual diagram illustrating a system 100 configured to detect magnitudes of trends in user-generated content and facilitate the delivery of targeted content based at least in part on demographic data of the one or more users associated with the user-generated content, in accordance with one or more aspects of the present disclosure. System 100 includes client device 102A, information distribution system 112, content provider system 124, and network 128.

Network 128 represents any communication network (e.g., public, private, commercial, governmental, or residential) that communicatively links two or more computing devices or systems for the transmission of information. For example, network 128 may be a wireless and/or wired network for transmitting data between two or more computing devices located at two or more different physical locations. In some examples, network 128 may represent the Internet. Client device 102A, information distribution system 112, and content provider system 124 may send and receive data via network 128 using various suitable communication techniques. For instance, data may be transmitted between the devices using communication links 136A-136C, which may be wired and/or wireless. Network 128 may include any required hardware for communicatively linking computing client device 102A, information distribution system 112, and content provider system 124. For example, network 128 may include various switches, hubs, routers, and other network equipment that provides for the exchange of information between the devices.

Client device 102A represents any type of personal computing device from which a person can view, listen to, feel, or otherwise obtain output based at least in part on information received via a network, such as network 128. For example, client device 102A may be a laptop computer, a mobile telephone, phones, a tablet computers, a set-top box, a desktop computer, a server, a mainframe, a wearable device (e.g., a watch, computerized glasses, and the like), a personal digital assistant (PDA), a gaming system, a media player, an e-book reader, a television platform, a digital media player, an automobile navigation and/or entertainment system, or any other type of mobile and/or non-mobile computing device that is configured to communicate (e.g., transmit and receive data) across a network and output information received via the network to a user.

Client device 102A includes user interface component 104A. User interface component 104A may include various technologies for receiving input from, and/or outputting information to, a user of user device 10. For example, user interface component 20 may include a microphone, a touch screen or other type of presence-sensitive screen, and other types of sensors and input devices for receiving input from a user. User interface component 104A may include a display (e.g., liquid crystal (LCD), light emitting diode (LED), organic light-emitting diode (OLED), or any other type of display), a speaker, a haptic feedback device, or any other type of output device for outputting visible, audible, and/or haptic feedback type information to a user of client device 104A. Although illustrated as a presence-sensitive display integrated with client device 102A, in some examples, user interface component 104A may be a display device, such as a monitor integrated in a laptop computer, or a standalone monitor coupled to a desktop computing device, to name only a few examples.

User interface component 104A may provide a user interface from which a user may interact with client device 102A to cause client device 104A to perform one or more operations. For example, user interface component 104A may give a user access to a service, provided by information distribution system 112, for receiving content (e.g., social media, news, television, streaming audio, streaming video, or other types of content) distributed across network 128. As further described in this disclosure, information distribution system 112 may provide content via network 128 to client device 102A. Client device 102A may process and output the content as one or more graphical images, sounds, and haptic-feedback sensations, at user interface component 104A.

Client device 102A may include a client module 106A. Client module 106A may send information generated by a user to and receive information from an information network provided by information distribution system 112. For instance, a user may have a user account stored at information distribution system 112. The user account may include a unique identifier (e.g., a username) for the user, authentication credentials, and personal information (e.g., name, phone number, email address, home address, to name only a few examples). Client module 106A may authenticate with information distribution system 112 based at least in part on authentication credentials provided by the user to client device 102A.

In some examples, client module 106A may provide a graphical user interface (GUI) that enables a user to generate or otherwise compose user content that client module 106A sends to information distribution system 112. Such user content may include text, images, video, and/or audio information. In some examples, a user may compose a message that includes various content. In addition to content, a message may include one or more hashtags and/or mention tags. In some examples, a hashtag may represent or otherwise identify a particular topic associated with the content of a message. As such, a user composing a message on a particular topic may associate hashtag for the topic with the message. A mention tag may represent or otherwise identify a particular user that has a corresponding user account at information distribution system 112. A user composing a message who wishes to refer to or address another particular user may associate a mention tag for the particular user with the message. When a user generates user content 108, client module 106A may send user content 108 to information distribution system 112, which may process and/or distribute the user content as further described in this disclosure.

Client module 106A may enable the user to perform one or more functions associated with user content. For instance, client module 106A may enable a user to "share," "re-share," "read," and "follow" content as well as "follow" and "mention" other users. In some examples, "sharing" a message or content may refer to composing an original message or original content that is subsequently distributed by information distribution system 112 to other users. In some examples, "re-sharing" a message or content may refer to an operation initiated by a user to re-post a message or content that was originally generated by another user. In some examples, "reading" a message or content may refer to an activity of a user to view the message or content. In some examples, "following" may refer to an operation initiated by a user to subscribe to messages and/or user content of another user. As such, a user that follows a particular user may receive updates of messages and/or user content generated by the particular user. In some examples, "mentioning" a particular user may refer to an operation initiated by a user to identify or otherwise associate the particular user with a message or user content.

Client module 106A may perform operations described herein using software, hardware, firmware, or a mixture of both hardware, software, and firmware residing in and executing by client device 102A or at one or more other remote computing devices. As such, client module 106A may be implemented as hardware, software, and/or a combination of hardware and software. Client device 102A may execute client module 106A as or within a virtual machine executing on underlying hardware. Client module 106A may be implemented in various ways. For example, client module 106A may be implemented as a downloadable or pre-installed application or "app." In another example, client module 106A may be implemented as part of an operating system of client device 102A.

As shown in FIG. 1, system 100 also includes information distribution system 112. Information distribution system 112 may implement techniques of this disclosure to detect trends in user-generated content based at least in part on one or more hashtags; provide content providers, such as advertisers, with timely and granular demographic data about users associated with specific trends that are growing rapidly or are predicted to grow rapidly; and provide targeted content received from content providers to one or more client devices. Information distribution system 112 may be implemented as one or more computing devices, including but not limited to: desktop computers, laptop computers, mainframes, servers, cloud computing systems, and the like.

Information distribution system 112 may include data and one or more modules, that when executed perform one or more operations. For example purposes, information distribution system 112 includes distribution module 114, trend analytics module 116 and user data 118; however, information distribution may include more or fewer modules or data in other examples. User data 118 may include data representing user accounts and demographic data about each user. As described above, a user account for a user of information distribution system 112 may include is not limited to: a user name, password, phone number, email address, and home address. In some examples, user data 118 may also include, current location of the user, devices authenticated with the user, interests of the user, history of content generated by the user, history of content read and/or followed by a user, hashtags and/or mention tags used by the user, other users followed by the user, other users following the user, private messages sent and/or received by the user, and/or search history of the user, to name only a few examples.

Information distribution system 112 may also include distribution module 114. Distribution module 114 may construct and maintain information generated by users and/or operators of information distribution system 112. Distribution module 114 may receive user content 108 from one or client devices, and store and organize the user content in the information network. The user content may be stored and organized using any number of datastores and data structures, such as but not limited to graphs, lists, tables, a Relational Database Management System (RDBMS), Object Database Management System (ODBMS), and/or Online Analytical Processing (OLAP) system.

Distribution module 114 may parse or analyze user content to share or otherwise redistribute the user content to other users of information distribution system 112. For example, numerous users may each share or re-share content for a particular topic, and include or associate hashtag for the topic with the content. As an example, multiple users may each share content about the Olympics and include a hashtag #Olympics with the content (e.g., text and/or pictures). Distribution module 114 may receive the content and parse the hashtag #Olympics to structure content associated with the hashtag as searchable. In this way, if a user wishes to view all content associated with #Olympics, the user may submit a query to distribution module 114, which may return a set of content or messages that include the hashtag #Olympics. In some examples, distribution module 114 may automatically send to a user's client device, without additional user intervention, content or messages that include the hashtag #Olympics, if the user previously searched for, shared, re-shared, and/or viewed content associated with the hashtag #Olympics.

Distribution module 114 may parse or analyze user content to share or otherwise redistribute the user content to other users of information distribution system 112 based at least in part on whether a user is following another particular user or has mentioned the particular user. For instance, if the user provides user input to client module 106A to follow a particular user, information distribution system may receive an indication of the user input and store the indication with the user's account. When the particular user shares or re-shares content, information distribution system 112 may send the content to client device 102A such that the user can view the content. As another example, if the user mentions the particular user in shared or re-shared content, information distribution system 112 may receive the content and send the content or notification of the mention to a client device of the particular user that was mentioned. In some examples, distribution module 114 may store information about user content viewed by a particular user. For instance, client module 106A may send data that indicates the user has viewed specific user content to information distribution system 112. Distribution module 114 may store data that indicates the user has viewed the specific user content.

Although a number of examples above have described how distribution module 114 determines relationships between user content and redistributes user content to client devices, many other examples of distributing content and determining relationships are also possible.

In some instances, the amount of content associated with a particular hashtag may grow or decline rapidly relative to content associated with other hashtags. The rapid change may be due to a particular event, controversy, person, or topic that captures or loses the interest of a large audience of users. Such change in the increase or decrease of content associated with the hashtag may represent a trend. A magnitude of a trend may represent the degree interest or engagement by an audience of users. For instance, if a magnitude of a trend is high, the degree of interest by the audience of users may be high. As an example, there may be relatively more users in the audience and those users may be more engaged in content for the particular event, controversy, person, or topic. Conversely, if a magnitude of a trend is low, the degree of interest by the audience of users may be low. As an example, there may be relatively fewer users in the audience and those users may be less engaged in content for the particular event, controversy, person, or topic.

In some examples, distribution module 114 may, in addition to re-distributing user content to client devices as described above, send targeted content to client devices for display. Targeted content may include, but is not limited to: advertisements, offers, rewards, discounts, political information, public interest information, entertainment information, sports information, or any other informational content. As shown in FIG. 1, distribution module 112 may send collocated content 110 that includes targeted content and/or distributed user content from other users. Client module 106A may generate a graphical user interface 130 for display that includes information included in collocated content 110, such as user content 134 and targeted content 136. In some examples, user interface 130 outputs information in a sequence or stream of "cards" or graphical user elements 132A-132D. The sequence or stream of "cards" may be ordered in chronological or reverse chronological order, in some examples. As shown in FIG. 1, card 132B includes an icon 138A and user content 134. Card 132C includes an icon 138B and targeted content 136. Icon 138A may correspond to the particular user that shared or re-shared user content 134. Icon 138B may correspond to the particular content provider that provided targeted content 136.

As shown in FIG. 1, targeted content 136 may be interspersed with other user content in graphical user interface 130. Accordingly, if a user is viewing a sequence or stream of cards, such as cards 132, information distribution system may also include one or more cards with targeted content. As an example, if the sequence or stream of cards is associated with a specific topic, targeted content that is relevant to the specific topic may be included in the sequence or stream of cards.

In some examples, information distribution system 112 may receive targeted content from content providers operating one or more content provider systems, such as content provider system 124. Content providers may include advertising agencies, companies, public interest organizations, governments, individual persons, and political candidates, to name only a few examples. Such content providers may be interested in providing target content to users of information distribution system 112. More particularly, content providers may be interested in generating and displaying targeted content to specific audiences (e.g., sets of users of information distribution system 112) that are highly engaged or interested in a particular event, controversy, person, or topic.

Techniques of the disclosure, implemented by trend analytics modules 116, may identify trends in user generated content, based at least in part on a set of metrics, and provide content providers with granular demographic data of users participating or otherwise associated with the trend. The content providers may use the demographic data and advance notice of an identified trend to generated targeted content for the specific audience of the trend. By identifying a trend and providing advanced notice of the trend, as well as the demographic data for the audience of the trend, content providers can generate more relevant and timely targeted content for distribution to users of information distribution system 112. As a result, if content providers bid or otherwise compete to distribute targeted content to users of information distribution system 112, the content provides may have greater confidence and/or pay more to distribute the content because the timeliness of the detected trend is improved and/or the specificity of demographic data is available or more accurate.

In operation, and as shown in FIG. 1, information distribution system 112 may receive, from one or more client devices, a stream of messages composed by one or more users of the one or more client devices. As described above, the messages may include user content as well as hashtags and/or mention tags. Trend analytics module 116 may parse or otherwise analyze the content of the messages to generate one or more metrics. In some examples, trend analytics module 116 monitors and processes the stream of messages in real-time. In other examples, trend analytics module 116 may process a batch of messages at scheduled times or in response to an asynchronous event (e.g., user input, quantity threshold satisfied for number of messages, to name only a few examples). Trend analytics module 116 may use the one or more metrics to generate a trending score that represents a magnitude of a trend for a particular hashtag. In this way, information distribution system 112 can notify content providers of trends and send corresponding demographic data for the trends to the content providers.

Trend analytics module 116 may determine, using a set of metrics that are based at least in part on the received messages, a trending score that represents a magnitude of a trend for a particular hashtag. To generate the set of metrics, trend analytics module 116 may identify message that include or are associated with a particular hashtag. For instance, trend analytics module 116 may identify each message in the stream of messages with the hashtag #Olympics. Trend analytics module 116 may parse the content of each message associated with the particular hashtag to compute the set of metrics.

Trend analytics module 116 may use any number of metrics to determine a magnitude of a trend for a particular hashtag. An example metric may include an amount (or count) of messages with the particular hashtag that are shared or re-shared per unit of time, which may also be referred to as a velocity for the particular hashtag. The velocity for a particular hash tag may be an amount of messages with the particular hashtag that are shared or re-shared per second, per minute, per hour, or per day, to name only a few examples. In some examples, velocity for a particular hash tag may be the amount of messages with the particular hashtag that are shared. Velocity for a particular hash tag may be the amount of messages with the particular hashtag that are re-shared. In some examples, larger velocities may indicate higher magnitudes of trends, while lower velocities may indicate lower magnitudes of trends.

In some examples, trend analytics module 116 may include a parameter that may be set by an operator that indicates a time duration over which the velocity for a particular hash tag is computed. For instance, trend analytics module 116 may compute the velocity for a particular hash tag based at least in part on a time duration starting from a current point in time and extending one hour into the past. More generally, for each metric, trend analytics module 116 may include a parameter that may be set by an operator that indicates a time duration over which the metric is computed. For instance, trend analytics module 116 may compute one or more of the metrics based at least in part on a time duration starting from a current point in time and extending one hour into the past.

Another example metric may include a rate of change in the amount of messages with the particular hashtag that are shared or re-shared per unit of time, which may also be referred to as an acceleration for the particular hashtag. For instance, analytics module 116 may compute a rate of change of the velocity for the particular hashtag. The acceleration for the particular hashtag may indicate rate at which the particular hashtag is trending. Accordingly, a larger acceleration for the particular hashtag may indicate more rapid growth for the particular hashtag and potentially a larger trend for the hashtag, while lower accelerations may indicate lower magnitudes of trends. In some examples, the acceleration may be referred to as a "second derivative of virality" or "viral acceleration." The acceleration may indicate a growing trend before the trend becomes much larger.

In some examples, trend analytics module 116 may determine a metric that indicates a total number of users that have shared or re-shared a message that includes the hashtag. Trend analytics module 116 may determine the total number of users that have shared or re-shared the message over a particular duration of time. Trend analytics module 116 may determine a metric that indicates a total number of followers of users that have shared or re-shared a message that includes the hashtag. In some examples, a total number of users that are following other users that have shared or re-shared a message that includes the hashtag may be referred to as a "nodality" metric. As another metric, trend analytics module 116 may determine a total number of active followers of users that have total number of users that have shared or re-shared a message that includes the hashtag. An active follower may be a follower that has recently interacted with information distribution system 112 within a particular time duration. For instance, an active follower may have interacted with distribution system 112 within a time duration starting from a current point in time and extending one day into the past. In some examples, larger amounts of followers or active followers may indicate higher magnitudes of trends, while fewer amounts of followers or active followers may indicate lower magnitudes of trends.

Trend analytics module 116 may determine a metric that indicates the dispersion of users within a social graph, who are sharing and re-sharing messages that include the hashtag. For instance, trend analytics module 116 may generate a social graph, where each node indicates a user. Each edge between two nodes represents a relationship between the two users of the respective nodes. For instance, an edge between two nodes may indicate that one user is a follower of another user. In another example, an edge may indicate that one user has mentioned another user in a message. In any case, trend analytics module may determine a distance or number of edges between one user that shared and or re-shared a message that include the hashtag and another user who also shared and or re-shared a message that include the hashtag. Larger distances may indicate greater dispersion of the hashtag. Accordingly, a metric that indicates larger dispersion of the one or more users, who are sharing and re-sharing messages that include the hashtag, may indicate a greater magnitude of a trend for the hashtag. A metric that indicates smaller dispersion of the one or more users, who are sharing and re-sharing messages that include the hashtag, may indicate a smaller magnitude of a trend for the hashtag.

Trend analytics module 116 may determine, as a metric, a percentage or count of the messages with the hashtag that include media. Examples of media may include, pictures, audio or video content. In some examples, a higher percentage or count of the messages with the hashtag that include media may indicate higher magnitudes of trends, while lower a percentage or count of the messages with the hashtag that include media may indicate lower magnitudes of trends. As another metric, analytics module 116 may determine a percentage or count of messages with the hashtag that include a Uniform Resource Locator or outbound link to content that is not hosted or managed by information distribution system 112. In some examples, a higher percentage or count of the messages with the hashtag that include a URL or link to content may indicate higher magnitudes of trends, while lower a percentage or count of the messages with the hashtag that include a URL or link to content may indicate lower magnitudes of trends. In some examples, analytics module 116 may determine a percentage or count of messages with the hashtag that include a URL or outbound link to a mass media organization, such as, but not limited to, a newspaper, television organization, radio organization that originate and/or report content.

Although a number of different metrics have been listed above, any number of additional metrics may also be used in accordance with techniques of the disclosure. Other metrics may include but are not limited to: number of searches for a particular hashtag, number of mentions of influential users (e.g., users have more than a threshold number of followers), number of hashtag mentions, number of users reading messages associated with the hashtag, and/or number of re-shares of messages associated with the hashtag. In some examples, one or more of the metrics may be represented as a numeric value, such as an integer or non-integer value. In some examples, one or more of the metrics may be represented as a Boolean or discrete value. Trend analytics module 116 may, based at least in part on parsing the user content, store data to compute one or more of the metrics. In this way, trend analytics module 116 may store historical data for one or more of the metrics, such that metrics can be computed for specific time durations.

Figure 3:
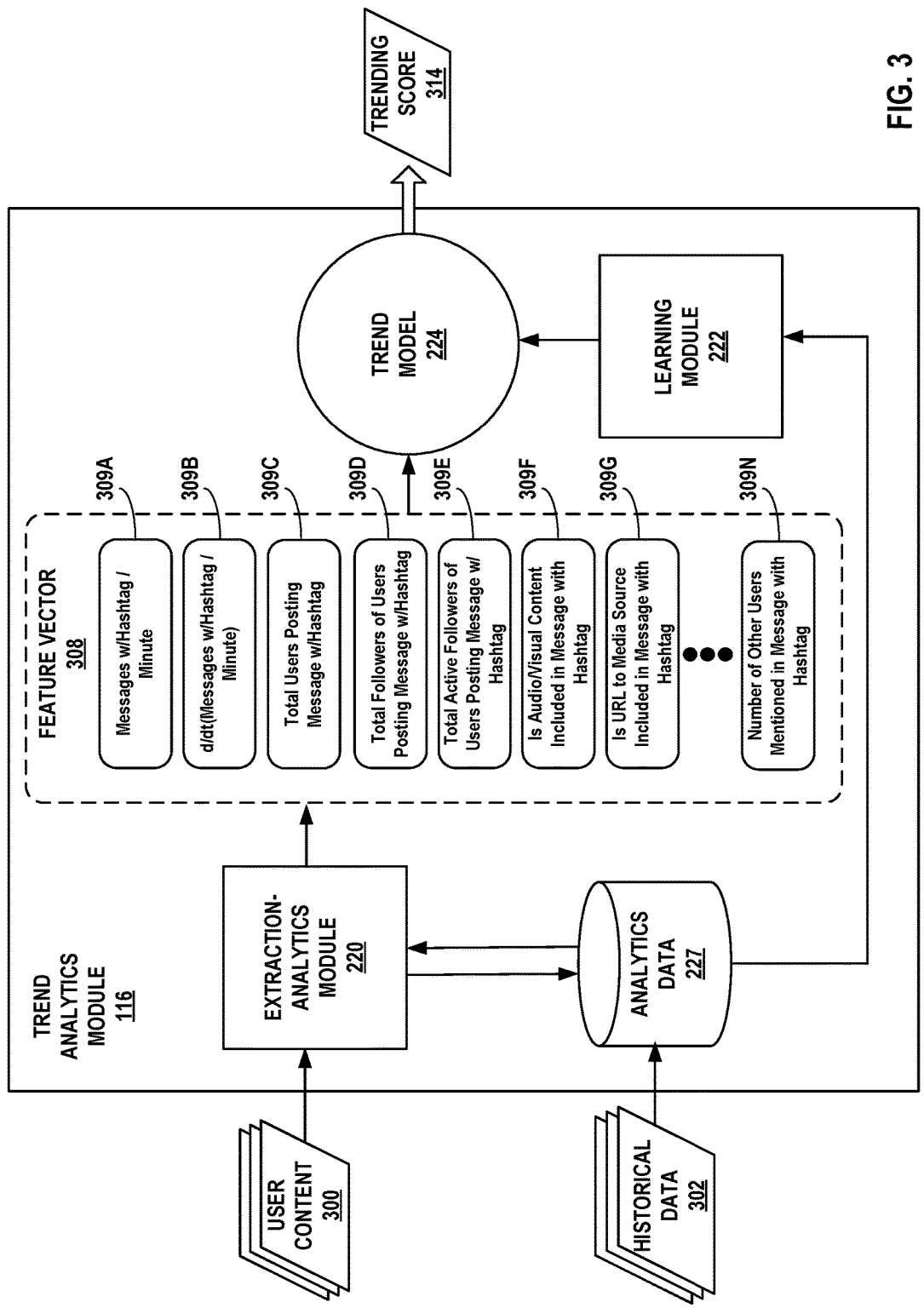
FIG. 3 is a conceptual diagram of a module to detect magnitudes of trends in user-generated content, in accordance with one or more techniques of the disclosure.

To determine a trending score that represents a magnitude of a trend for the particular hashtag, trend analytics module 116 combine or otherwise process one or more metrics. In on example, trend analytics module 116 may compute a sum or weighted sum of each metric to generate a trending score. In the case of discrete valued metrics (e.g., whether a message includes media or includes a link) trend analytics module may assign a respective numeric value for each respective discrete value. In some examples, trend analytics module 116 may compute a weighted sum by applying a respective weight to each metric (e.g., determining the product of weight and metric) and summing the weighted metrics. The weights may be defined by an operator of information distribution system 112 or may be hard-coded as pre-defined values. In other examples, trend analytics module 116 may use machine learning to receive a set of metrics and provide, as output, a trending score. For instance, trend analytics module 116 may use supervised and/or reinforcement learning to train a model that generates a trending score for a hashtag based at least in part on a set of metrics that are input to the model. FIG. 3 provides further details of using such machine learning techniques to receive a set of metrics and provide, as output, a trending score.

Trend analytics module 116 may, in response to determining that a trending score satisfies a threshold, send, to content provider system 124, a set of demographic data 120 that describes one or more of the users who associated with the particular hashtag for which the trending score was generated. For instance, trend analytics module 116 may detect a "viral acceleration" of a particular hashtag using one or more metrics described in this disclosure. Content provider system 124 may be one or more computing devices of a content provider. In some examples, content provider system 124 may be implemented as one or more computing devices, including but not limited to: desktop computers, laptop computers, mainframes, servers, cloud computing systems, and the like.

Information distribution system 112 may provide a graphical user interface to content provider system 124 that identifies one or more hashtags having trending scores that satisfy a threshold. The graphical user interface may also include demographic data of users associated with the hashtags having trending scores that satisfy a threshold. In some examples, the graphical user interface may allow a content provider to upload, submit or otherwise provide targeted content 126 to information distribution system 112. The graphical user interface may also allow a content provider to submit a bit or price that the content provider is willing to pay to have targeted content of the content provided displayed to client devices of users associated with the hashtag. Information distribution system 112 may provide the graphical user interface to content provider system 124 as web application (e.g., one or more web pages), a mobile application (e.g., an application executable by a mobile computing device), or a desktop application (e.g., an application executable by a desktop computing device), to name only a few examples.

As described above, trend analytics module 116 may determine whether a trending score for a hashtag satisfies a threshold. For instance, trend analytics modules 116 may select a top N number of trending scores, and send hashtag and demographic data associated with the top N trending scores to content provider system 124. As an example, trend analytics modules 116 may maintain a set of trending analytics scores and select the top N=10 highest trending scores. As such, the threshold may be 10th highest trending score, and any trending score greater than or equal to the 10th highest trending score satisfies the threshold. In other examples, the threshold may a particular value and any number of trending scores greater than or equal to the threshold will satisfy the threshold. In any case, the threshold may be set by an operator of information distribution system 112, a content provider or operator of content provider system 124, or the threshold may be a hard-coded valued.

In some examples, trend analytics module 116 may set different thresholds for different content providers based at least in part on one or more criteria. In some examples, a particular threshold may be based at least in part on one or more criteria. The one or more criteria may be set by an operator of information distribution system 112 and/or a content provider that operates content provider system 124. Examples of criteria may specify a particular industry (e.g., home improvement, video games, automobiles, sports, to name only a few examples). For instance, a content provider or operator of information distribution system 112 may specify an industry that is relevant to the content provider. Different industries may have different thresholds. As an example, a threshold for a sports industry may be higher than a threshold for a home improvement threshold.

Examples of criteria may include time intervals (e.g., a time of day, a day of the week, holiday periods, specific events, to name only a few examples). For instance, a time period from the evening through the morning (during which individuals may be sleeping) may correspond to a lower threshold than a time period from the morning through the evening (during which individuals may be awake). In other examples, a threshold may be set to higher or lower based at least in part on a particular holiday season or event where greater amounts of user activity are expected on information distribution system 112. For such seasons or events where user activity is higher, a threshold may be higher.

In some examples, a threshold may be based at least in part on criteria that specify demographic dimensions. A demographic dimension, in some examples, may be any attribute of demographic data, such as age, gender, or geographic location, to name only a few examples. For instance, a threshold may be based at least in part on one or more ages and/or age ranges. A threshold may be higher if a greater amount of the messages are generated by individuals within a particular age range. In this way, if a particular age range of users is typically more active in their use of information distribution system 112, then the threshold may be higher to satisfy than another age range. An operator of information distribution system 112 and/or a content provider may specify such criteria for any one or more dimensions of demographic data.

In some examples, a threshold may be based at least in part on semantic content of messages that include a particular hashtag. In some examples, semantic content may include text, images, audio content, or video content to name only a few examples. For instance, some semantic content or language may be more frequently composed by users in messages and/or hashtags. One or more criteria may specify such semantic content or language. As such, a threshold, based at least in part on the criteria, may be higher for frequently or commonly used content or language in hashtags and/or messages, such that fewer false positives of higher magnitude trends occur with respect to particular hashtags.

Although a number of example criteria have been provided above, any number of suitable criteria may be used alone or in combination to set or generate one or more thresholds. In some examples, a particular threshold may be generated from multiple different criteria. For instance, the particular threshold may include one or more parameters that each correspond to one or more criteria, where each of the one or more criteria must be satisfied in order for the particular threshold to be satisfied. In other examples, each criterion may have a weight, and the respective weights are combined or summed to generate a value that represents a particular threshold.

In some examples, trend analytics module 116 may also provide one or more alerts or notifications to one or more content provider systems, in response to determining that a threshold is satisfied. For instance, trending analytics module 116 may send one or more of an email, text message, phone call, instant message, or any other suitable communication to notify a content provider that a threshold has been satisfied. In some examples, a content provider may specify one or more criteria to trigger or filter such alerts or notifications, such as industries, events, time periods, names, to name only a few examples that are associated with messages and/or hashtags of such messages. In this way, trending analytics module 116 may send an alert or notification to a content provider if a filter or trigger specified by the content provider is satisfied. In some examples, a content provider may set the trigger or filter and type of alert or notification through an interface provided by trend analytics module 116 to content provider system 124.

As described above, trend analytics module 116 may send a set of demographic data that describes one or more of the users who associated with the particular hashtag to content provider system 124, in response to determining that a trending score for a hashtag satisfies a threshold. Demographic data may include, but is not limited to the following dimensions: age, gender, location, married status, children status, education level, income level, interests, shopping history, search and/or browsing history, and health information, to name only a few examples. Demographic data may also include, but is not limited to the following dimensions: history of content generated by the user, history of content read and/or followed by a user, hashtags and/or mention tags used by the user, other users followed by the user, other users following the user, private messages sent and/or received by the user, and/or search history of the user.

Demographic data may include personally sensitive and/or personally identifiable information about users of information distribution system 112, which may be referred to as "sensitive data." In some instances, information distribution system 112 only shares demographic data of a user if the user expressly "opts-in" or provides an explicit indication of user input that authorizes information distribution system 112 to share such sensitive data with third parties, such as content providers or other entities. In some examples, information distribution system 112 provides the user with full disclosure and requires full consent of the user before collecting and/or sharing any demographic and/or sensitive data. In some examples, a particular jurisdiction may have specific privacy requirements with respect to demographic data. Information distribution system 112, in such examples, may implement controls that prevent or restrict the sharing of demographic data in order to comply with privacy requirements of a particular jurisdiction.

To send demographic data to content provider system 124 for a particular hashtag that has a trending score that satisfies a threshold, trend analytics modules 116 may determine a set of users associated with the hashtag. A user may be associated with the hashtag if the user shared message with the hashtag, re-shared a message with the hashtag, and/or read a message with the hashtag. Upon determining the set of users associated with the hashtag, trend analytics modules 116 may select demographic data associated with each of the set of users. Trend analytics modules 116 may aggregate, summarize, or divide the demographic data across any dimension, such as age, gender, location, history of content generated by the user, history of content read and/or followed by a user, hashtags and/or mention tags used by the user, to name only a few examples.

Trend analytics module 116 may aggregate, summarize, or divide the demographic data based at least in part on one or more criteria provided by an operator of information distribution system 112 and/or a content provider of content provider system 124. For instance, a content provider may provide criteria that specifies which dimensions of demographic data to send to content provider system 124. The one or more criteria may also specify a time frame for which trend analytics module 116 may generate the demographic data. In some examples, the criteria may specify the type or degree of aggregation, summarization, or division applied to the demographic data. In some examples, trend analytics module 116 may generate and send different sets of demographic data that correspond to whether users shared, re-shared, or read messages associated with the hashtag.

Trend analytics module 116 may also send, to content provider system 124, values representing any one or more of the metrics that were used to generate the trending score. Trend analytics module 116 may also send a value representing the trending score for the hashtag. As described above, demographic data 120, values representing any one or more of the metrics that were used to generate the trending score, and/or a value representing the trending score for the hashtag may be provided to content provider system 124 via a graphical user interface, message, and/or application programming interface (API) to name only a few examples.

Content provider system 124 may receive the hashtag and demographic data 120 for the hashtag. In addition, content provider system 124 may receive values representing the trending score and/or metrics that were used to generate the trending score. Based at least in part on the data received from information distribution system 112, a content provider of content provider system 124 may generate or otherwise select targeted content 126. More specifically, a content provider of content provider system 124 may use the demographic data 120 to tailor targeted content 126 to the audience described by the demographic data. Because content provider system 124 receives demographic data in response to detected trend, the content provider of content provider system 124 has specific, accurate data that describes the audience to which the targeted content will be delivered. In addition, because trend analytics module 116 detects the trend and the magnitude of the trend, the content provider of content provider system 124 has advance notice of the scale of the trend.

Content provider system 124 may send, submit or otherwise provide targeted content 122, selected or generated by the content provider using the demographic data, to information distribution system 112. In some examples, content provider system may also provide a bid or price that indicates an amount of money that the content provider will pay for targeted content 122 to be output for display at one or more client devices of users associated with the hashtag for which the trending score satisfies the threshold. Information distribution system 112 may receive bids from multiple different content provider systems to display targeted content. Information distribution system 112 may determine the highest bid send the targeted content of the content provider with the winning bid to client devices of one or more users associated with the hashtag.

In response to receiving targeted content 122 that is based at least in part on the particular hashtag and the set of demographic data from content provider system 124, information distribution system 112 may send the targeted content for the winning bid to one or more of the one or more client devices of users associated with the particular hashtag. In some examples, information distribution system 112 may send collocated content 110 to one or more client devices of users associated with the particular hashtag. Collocated content 110 may include targeted content, such as targeted content 136, and user content 134. In some examples, information distribution system 122 may send targeted content 136 in a separate communication from user content 134. In other examples, information distribution system 122 may send targeted content 136 and user content 134 as collocated content 110 in the same communication to one or more client devices.

Client device 102A may receive collocated content 110 and client module 106A may select the targeted content 136 and user content 134. Client module 106A may include targeted content 136 and user content 134 in cards 132B and 132C that are output for display. In some examples, a user may provide user input to select targeted content 136. If targeted content 126 is selected, client module 106A may send data to information distribution system 112 that indicates the selection of targeted content 126. In some examples, information distribution system 112 may store an indication of the selection of targeted content 126 in user data 118. Trend analytics module 116 may send data to content provider system 124 that indicates the selection of targeted content 126.

Figure 2:
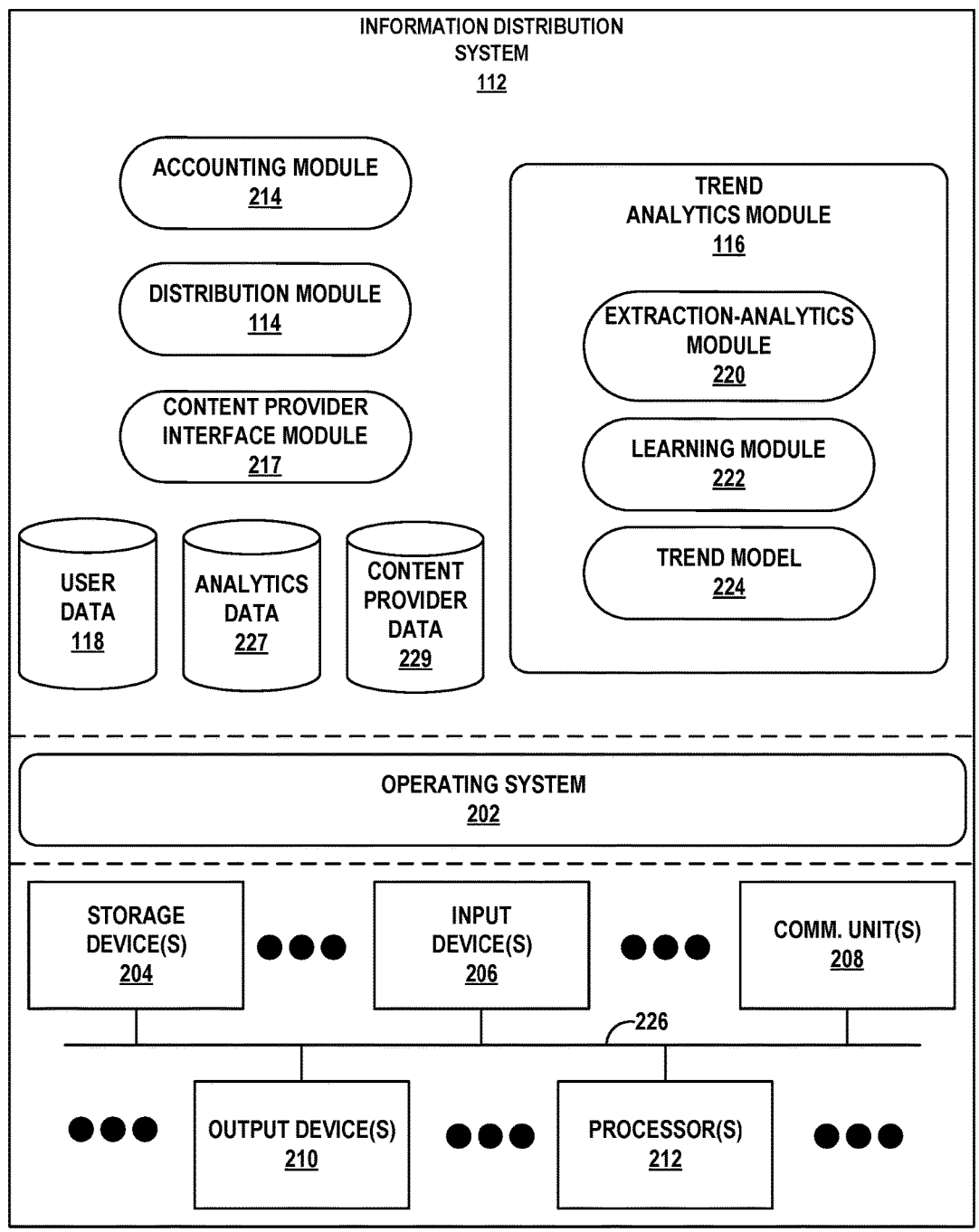
FIG. 2 is a block diagram illustrating further details of an example information distribution system that is configured to detect magnitudes of trends in user-generated content and to facilitate the delivery of targeted content based at least in part on demographic data of the one or more users associated with the user-generated content, in accordance with one or more aspects of the present disclosure.

FIG. 2 is a block diagram illustrating further details of an example information distribution system that is configured to detect magnitudes of trends in user-generated content and facilitate the delivery of targeted content based at least in part on demographic data of the one or more users associated with the user-generated content, in accordance with one or more aspects of the present disclosure. Information distribution system 112 of FIG. 2 is described below within the context of FIG. 1. FIG. 2 illustrates only one particular example of information distribution system 112, and many other examples of information distribution system 112 may be used in other instances and may include a subset of the components included in example information distribution system 112 or may include additional components not shown in FIG. 1.

As shown in the example of FIG. 2, information distribution system 112 includes accounting module 214, distribution module 114, content provider interface module 217, trend analytics module 116, user data 118, analytics data 227, operating system 202, one or more storage devices 204, one or more input devices 206, one or more communication units 208, one or more output devices 210, one or more processors 212, and one or more communication channels 226. Trend analytics module 116 includes extraction-analytics module 220, learning module 222, and trend model 224.

Communication channels 226 may interconnect each of the components 202-227 for inter-component communications (physically, communicatively, and/or operatively). In some examples, communication channels 226 may include a system bus, a network connection, an inter-process communication data structure, or any other method for communicating data.

One or more input devices 206 of information distribution system 112 may receive input and one or more input devices 206 may generate output. Examples of input are tactile, audio, and video input and examples of output are tactile, audio, and video output. In one example, input devices 206 include a presence-sensitive display, touch-sensitive screen, mouse, keyboard, voice responsive system, video camera, microphone, or any other type of device for detecting input from a human or machine. Whereas in one example, output devices 210 include a presence-sensitive display, sound card, video graphics adapter card, speaker, cathode ray tube (CRT) monitor, liquid crystal display (LCD), or any other type of device for generating output to a human or machine.

One or more communication units 208 may allow information distribution system 112 to communicate, via one or more wired and/or wireless networks, with external devices and/or systems. For example, communication units 208 may transmit and/or receive network signals being transmitted and received other devices and/or systems connected to network 128. Examples of communication units 208 include network interface cards (e.g. such as an Ethernet card), optical transceivers, radio frequency transceivers, GPS receivers, or any other type of device that can send and/or receive information via a network. Other examples of communication units 208 may include long and short wave radios, cellular data radios, wireless network radios, as well as universal serial bus (USB) controllers.

One or more storage devices 204 of information distribution system 112 may store information or instructions that information distribution system 112 processes during operation of information distribution system 112. For example, storage devices 204 may store data that modules or components may access during execution at information distribution system 112. In some examples, storage devices 204 are temporary memories, meaning that a primary purpose of storage devices 204 is not long-term storage.

Storage devices 204 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 204 may be configured to store larger amounts of information than volatile memory and may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories.

Storage devices 204, in some examples, include one or more computer-readable storage media. In some examples, storage devices 204 represent non-transitory computer readable storage medium that store instructions later executed by one or more processors 212 during operation of information distribution system 112. For example, storage devices 204 may store program instructions and/or information (e.g., data) associated with modules and/or components 214, 114, 217, 116, 22, 222, 224, 118, 227, and 202.

One or more processors 212 may implement functionality and/or execute instructions within information distribution system 112. For example, processors 212 on information distribution system 112 may receive and execute instructions stored by storage devices 204 that execute the functionality of modules 214, 114, 217, 116, 220, 222, 224, and 202. The instructions executed by processors 212 may cause information distribution system 112 to read/write/etc. information, such as one or more data files at user data 118 and/or analytics data 227 and stored within storage devices 204 during program execution. Processors 212 may execute instructions of modules 214, 114, 217, 116, 220, 222, 224, and 202 to cause information distribution system 112 to perform the operations described in this disclosure. That is, modules 214, 114, 217, 116, 220, 222, 224, and 202 may be operable by processors 212 to perform various actions or functions of information distribution system 112, for instance, detecting magnitudes of trends in user-generated content and facilitating the delivery of targeted content based at least in part on demographic data of the one or more users associated with the user-generated content, in accordance with one or more aspects of the present disclosure.

As shown in FIG. 2, information distribution system 112 includes accounting module 214. Accounting module 214 may operate auctions for distributing targeted content to client devices for particular hashtags. For instance, in response to trend analytics module 116 determining that a trending score for a particular hashtag satisfies a threshold, trend analytics modules 116 may send a notification to accounting module 214 that indicates the particular hashtag.

Accounting module 214 may receive bids from one or more content provider systems to distribute targeted content for the particular hashtag. In some examples, accounting module 214 may determine a highest bid or price from a set of bids, and select the targeted content associated with the highest bid. Accounting module 214 may store a record that indicates the bid price and the content provider in content provider data 229. In some examples, content provider data 229 may further include information about content providers, such as but not limited to: name, address, email, phone number, and payment information. Accounting module 214 may debit an account and/or generate a bill for the content provider for the cost of distributing the targeted content based at least in part on the bid price. In some examples, accounting module 214 may communicate with one or more payment processing systems, such as banks, payment card companies and the like, to obtain payment and transfer of funds for the cost of distributing the targeted content. In some examples, accounting module 214 may receive one or more counts of the number of users that viewed and/or clicked on (e.g., selected) targeted content that was distributed to one or more client devices. Accounting module 214 may compute the cost of distributing the targeted content based at least in part on the one or more counts of the number of users that viewed and/or clicked on targeted content.

In some examples, information distribution system 112 may include a content provider interface (CPI) module 217. CPI module 217 may generate one or more graphical user interfaces that may be displayed at content provider systems. In some examples, CPI module 217 may provide one or more Representational state transfer (RESTful) interfaces, web services, or other application programming interfaces that may send and receive information with content distribution systems. In some examples, CPI module 217 may send alerts or notifications to content provider systems as described in FIG. 1 based at least in part on thresholds for hashtags that are satisfied.

In some examples CPI module 217 may generate, store, and send one or more web pages that provide one or more graphical user interfaces for content providers. For instance, CPI module 217 may generate and send demographic data, trending score information, hashtag information, and any other information, in web pages to content provider systems for display. As such, CPI module 217 may provide a "portal" or "dashboard" through which content providers may interact with information distribution system 112. CPI module 217 may also receive data from content providers, including but not limited to: targeted content, bids to distribute targeted content, alert/notification preferences, criteria for setting thresholds to name only a few examples. CPI module 217 may also receive user input from content provider systems that specifies where and/or how (e.g., shape, size) targeted content will be displayed within a graphical user interface of a client device. For instance, CPI module 217 may provide a one-click campaign setup graphical user interface in which a content provider can select target content to target an audience of users associated with the particular hashtag. The one-click setup may include presenting a set of potential instances of targeted content from which a content provider may select a particular instance of targeted content to distribute to one or more users associated with the particular hashtag. CPI module 217 may also authenticate content providers that attempt to access information distribution system 112 based at least in part on credentials that are stored in content provider data 229.

CPI module 217 may generate a graphical user interface that includes a set of top-N trending hashtags. In some examples, N may be set by an operator of information distribution system 112 or a content provider system. As an example, CPI module 217 may send a content provider a set of top 10 trending hashtags. The top-N trending hashtags may each be a hashtag that includes a trending score that satisfies a threshold, as described in FIG. 1. Accordingly, the top-N trending hashtags may each be a hashtag that includes a trending score that satisfies a threshold based at least in part on one or more criteria set by a content provider. CPI module 217 may generate a graphical user interface that includes demographic data of users associated with each hashtag. As described in this disclosure, trend analytics module 116 may aggregate, summarize, or divide the demographic data across any dimension, and in some examples, based at least in part on one or more user inputs provided by a content provider. CPI module 217 may send such demographic data to content providers. CPI module 217 may also send trending scores or data representing the trending scores for hashtags to a content provider. In some examples, CPI module 217 may send information for display to a content provider that indicates, for a particular hashtag, a set of top-N messages. For instance, the top-N messages may be the top-N message that were read and/or re-shared by other users. In some examples, CPI module 217 may send information for display to a content provider that indicates a geographic map or "viral footprint" of where and/or how fast particular hashtag is being shared, re-shared, and/or viewed, which may indicate the potential size and/or reach of the particular hashtag. In some examples, each instance of a particular hashtag associated with a message that is shared, re-shared, and/or viewed is represented by a point on a map.

In some examples, CPI module 217 may send statistical information to a content provider for targeted content in which the content provider won a big (e.g., the targeted content was distributed by information distribution system 112). In some examples, the statistical information may include a number of client devices that received the targeted content. In some examples, the statistical information may include a number of users that viewed and/or clicked on the targeted content. In some examples the statistical information may include a percentage of users associated with the hashtag that viewed and/or clicked on the targeted content (e.g., "share of voice"). In some examples, CPI module 217 may provide the statistical information on a real-time basis to a content provider system as the statistical information is generated by CPI module 217.

As shown in FIG. 2 information distribution system 112 also includes distribution module 114 as previously described in FIG. 1. Information distribution system 112 also includes trend analytics module as previously described in FIG. 1. Trend analytics module 116 may also include one or more of extraction-analytics module 220, learning module 222, trend model 224, and analytics data 227, each of which are described in further detail in FIG. 3.

Techniques of this disclosure may be applied to sharing, re-sharing, reading, and following content that includes a particular hashtag. In some examples, techniques of the disclosure may be applied to a set of different hashtags that each correspond to a particular topic. For instance, multiple different users may use different hashtags to refer to the same topic. Trend analytics module 116 may compare semantic content of different message to determine that a set of different hashtags correspond to the same topic. For example, based at least in part on a degree of similarity, in a range of degrees of similarity, between semantic content in different messages, such as but not limited to text, mentions, media, trend analytics module 116 may determine that one hashtag corresponds to one or more other hashtags for the same topic. If instance if the degree of similarity satisfies a threshold, trend analytics module 116 may determine that one hashtag corresponds to one or more other hashtags for the same topic. Accordingly, when generating a metric, trend analytics module 116 may generate the metric based at least in part on multiple hashtags that correspond to the same topic, rather than a single hashtag. As such, trend analytics module 116 may determine a trending score for a topic that corresponds to multiple hashtags. As with other examples of this disclosure, if the trending score satisfies a threshold, information distribution system 112 may send demographic data for users associated with one or more of the hashtags that correspond to the topic to content providers. In this way, trend analytics module 116 may target at "whole conversation" for a topic that may have multiple hashtags.

In some examples, distribution module 114 may receive targeted content for a particular hashtag from a content provider system. The targeted content may not include the particular hashtag. In some examples, distribution module 114 may include the particular hashtag in the targeted content such that the particular hashtag is visible when the targeted content is viewed by a user. For instance, the particular hashtag may be superimposed on the targeted content.

Techniques of the disclosure have been described with respect to determining one or more metrics for hashtags and generating trending scores for the hashtags. In some examples, techniques of the disclosure may be adapted and/or generalized to determining metrics for media, such as images, videos, and/or audio content and generating trending scores for the media. For instance, trend analytics module 116 may determine one or more metrics, for a particular image that is being shared, re-shared, and/or read. The metrics may be same as described with respect to hashtags in this disclosure, except that the metrics are based at least in part on messages and/or user content that include the particular image. To determine messages and user content that are associated with the particular image, trend analytics module 116 may perform one or more image recognition techniques on messages and user content to identify messages and user content that include the particular image. Similarly, audio and video recognition techniques may be applied to audio and video content to identify user content and message that include the same audio or video content. In the case of an image, trend analytics module may extract data from messages and user content that include the image, compute one or more metrics (e.g., velocity of the image, acceleration of the image, influence of users sharing and/or re-sharing the image, and the like) and determine a trending score based at least in part on the metrics.

FIG. 3 is a conceptual diagram of a module configured to detect magnitudes of trends in user-generated content, in accordance with one or more techniques of the disclosure. Trend analytics module 116 of FIG. 3 is further described below within the context of FIGS. 1-2. FIG. 3 illustrates only one particular example of trend analytics module 116, and many other examples of trend analytics module 116 may be used in other instances and may include a subset of the components included in example trend analytics module 116 or may include additional components not shown in FIG. 2 or 3.

As described in FIG. 1, trend analytics module 116 may use machine learning to receive a set of metrics and provide, as output, a trending score. Trend analytics module 116 may use supervised and/or reinforcement learning to train a model that generates a trending score for a hashtag based at least in part on a set of metrics that are input to the model. To generate a trending score using machine learning techniques, trend analytics module 116 may include extraction-analytics module 220, trend model 224, learning module 222, and analytics data 227.

Extraction-analytics module 220 may receive user content 300. In some examples, extraction-analytics module 220 receives user content from user data 118 and/or distribution module 114, as shown in FIG. 1. For instance, user content 300 may be an example of user content 108, as shown in FIG. 1. Extraction-analytics module 220 extracts data from user content 300 to compute one or more metrics as described in FIG. 1. For instance, extraction-analytics module 220 may receive a message and identify the particular hashtag associated with the message. Extraction-analytics module 220 may extract data from the message, such as the user that shared or re-shared the message, user content (e.g., text, images, videos, audio), mentions of other users, whether the message includes media, whether the message includes a URL or link, if the message is a re-share then the original author, the number of followers and/or active followers of the user that shared or re-shared the message, to name only a few examples of data extracted from the metrics to compute various metrics.

In some examples, extraction-analytics module 220 may store the extracted data, representations of the extracted data, and/or statistics of extracted data in analytics data 227. In some examples, analytics data 227 may store time information for the extracted data. Using the stored data of analytics data 227 extraction-analytics module 220 may compute one or more metrics. For instance, analytics data 227 may store, for a particular hashtag, a count of the number of shared, re-shared and/or read messages associated with the particular hashtag. Based at least in part on the count of the number of messages associated with the particular hashtag, extraction-analytics module 220 may compute, as one metric, a velocity of the hashtag over a particular time duration. In this way, extraction-analytics module 220 extracts data from user content 300, and may store the data for use in computing one or more metrics.

Trend analytics module 116 also includes a trend model 224 that generates a trending score based at least in part on feature vector 308, which includes metrics 309A-309N. In some examples, a feature vector 308 may be n-dimensional vector of values or features, where each value corresponds to a metric. As shown in FIG. 3, feature vector 308 includes a set of metrics 309A-309N. Each of metrics 309A-309N may be a numeric or discrete value that is retrieved and/or computed by extraction-analytics module 220.

In some examples, trend model 224 is trained by learning module 222 using supervised and/or reinforcement learning techniques. Trend model 224 may be implemented using any number of models for supervised and/or reinforcement learning, such as but not limited to, an artificial neural networks, a decision tree, naïve Bayes network, support vector machine, or k-nearest neighbor model, to name only a few examples. In some examples, learning module 222 initially trains trend model 224 based at least in part on a training set of metrics and corresponding trending scores. The training set may include a set of feature vectors, where each feature in the feature vector represents a value for a particular metric. Each feature vector may also have a corresponding trending score. By training trend model 224 based at least in part on the training set, trend model 224 may be configured by learning module 222 to generate larger trending scores for feature vectors that include metrics that correspond to trends with higher magnitudes. In the same way, trend model 224 is configured by learning module 222 to generate lower trending scores for feature vectors that include metrics that correspond to trends with lower magnitudes. Accordingly, trend model 224 may be trained, such that upon receiving a feature vector of metrics, trend model 224 may output a trending score that indicates a magnitude of a trend for a particular hashtag.

In some examples, a trending score 314 may be an integer value, non-integer value (e.g., rational number), or discrete value. In the case of an integer or rational number, trend model 224 may output a trending score 214 in a range of trending scores. The range of trending scores may include a minimum and maximum value. In one example, a minimum value may be −1 and a maximum value may be 1. In other examples, a minimum value may be 0 and a maximum value may be 10. Any suitable range of values may be used. In some examples, trending score 314 may be selected from a discrete set of values, such as High, Medium, Low.

In accordance with techniques of the disclosure, extraction-analytics module 220 may select data for a particular hashtag from analytics data 227 and compute one or more or more metrics that are stored in feature vector 308. Extraction analytics module 220 may input or otherwise apply feature vector 308 to trend model 224, which may have been previously trained based at least in part on a training set as described above. Trend model 224, upon receiving the feature vector, determines a trending score 314, which represents a magnitude of a trend for the particular hashtag. Using the trending score, trend analytics module 116 may determine whether the trending score satisfies a threshold. If the trending score satisfies the threshold, trend analytics module 116 may send a set of demographic data that describes one or more of the users who associated with the particular hashtag to a content provider system, as described in this disclosure.

Trend analytics module 116 may generate, and input or apply, feature vectors to trend model 224 periodically, such as accordingly a schedule or particular time interval. In other examples, trend analytics module 116 may input feature vectors in real-time as user content 300 is received and processed by extraction-analytics module 220. In still other examples, trend analytics module 116 may asynchronously generate, and input or apply, feature vectors to trend model 224. For instance, trend analytics module 116 may determine an asynchronous event such as a user input or that a criterion is satisfied, and input or apply feature vectors to trend model 224.

In some examples, trend analytics module 116 may receive historical data 302. In some examples, learning module 22 may use historical data 302 to perform online learning. Online learning may refer to learning module 222 training trend model 224 based at least in part on training data or training examples that are received while trend model 224 is also processing metrics to generate trending scores. Stated another way, online learning may refer to training trend model 224 while trend model 224 is in use to generate trend scores, rather than only training trend model 224 with an initial training set.

In some examples, historical data 302 includes data associated with various hashtags that indicate how a trend actually grew. Trend analytics module 116 may store historical data in analytics data 227. For instance, historical data 302 may include one or more actual metrics and one or more actual trending scores that were generated by trend model 224 and that correspond to the actual metrics. In some examples, historical data 302 may indicate one or more actual metrics and one or more actual trending scores at numerous different points in time. Learning module 222 may determine whether, for a particular trending score, a magnitude of a trend for a particular hashtag actually increased or decreased by an amount proportional to or reflected in the magnitude of the trending score. In this way, if learning module 222, for a given set of metrics, generated a trending score of a magnitude that did not reflect or was not proportional to the actual magnitude of the trend, then learning module 222 may update trend model 224. In some examples, learning module 222 may update trend model 224 by back-propagating an amount of error between a trending score that was generated by trend model 224 given a set of metrics and the actual magnitude of the trend. In this way, learning module 222 may update trend model 224, based at least in part on previous trending scores and actual trend results, to improve the accuracy with which trend model 224 generates trending scores that indicate the magnitude of a trend. As such, trend model 224, in some examples, may generate a trending score that predicts how large and/or quickly a trend will grow.

Learning module 222 may train trend model 224 with historical data 302 periodically, such as accordingly a schedule or particular time interval. In other examples, learning module 222 may train trend model 224 in real-time as historical data 302 is received by trend analytics module 116. In still other examples, learning module 222 may asynchronously train trend model 224. For instance, learning module 222 may determine an asynchronous event such as a user input or that a criterion is satisfied, and train trend model 224 using online learning as described in this disclosure.

Figure 4:
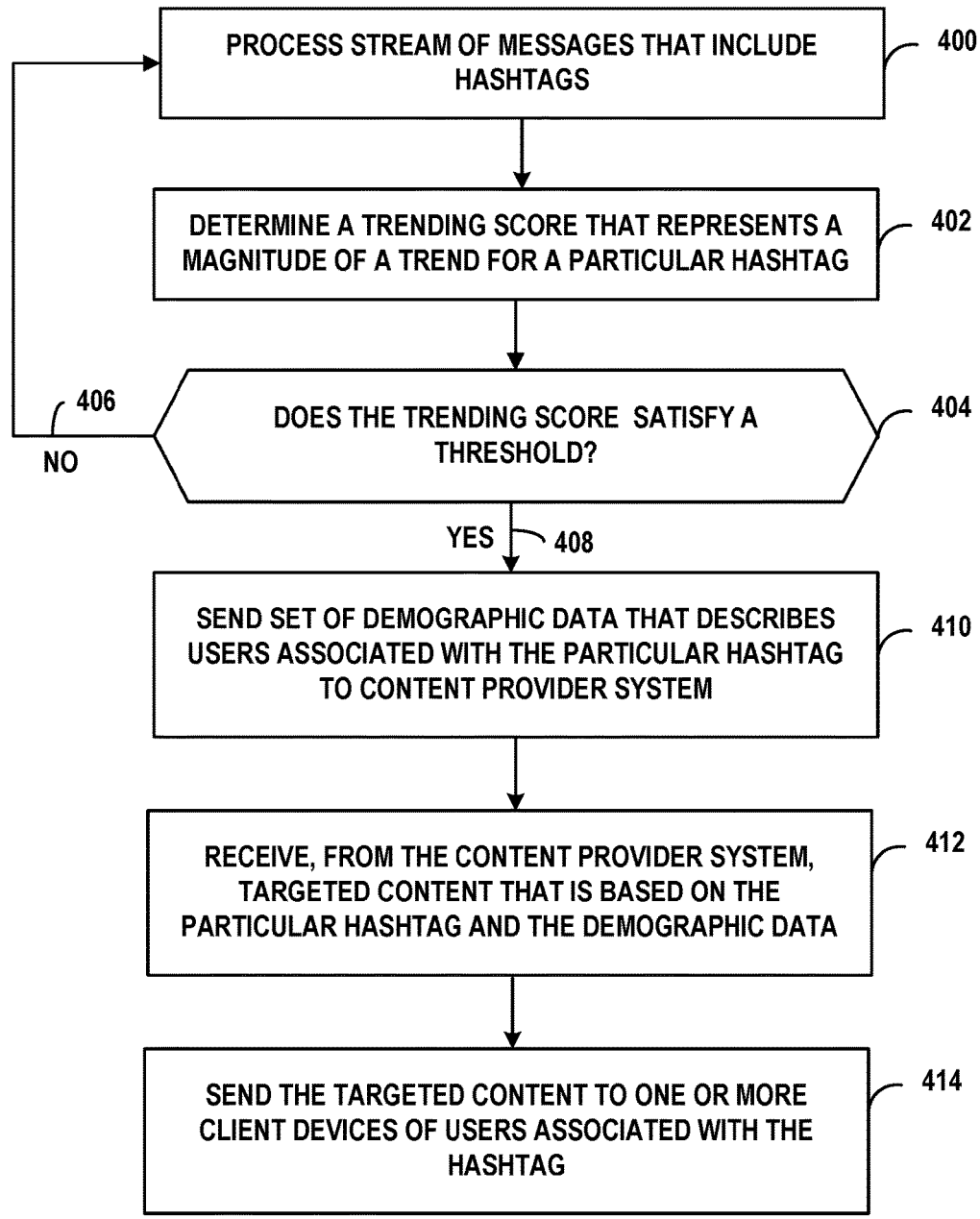
FIG. 4 is a flow diagram illustrating example operations of a computing device that implements techniques to detect magnitudes of trends in user-generated content and to facilitate the delivery of targeted content based at least in part on demographic data of the one or more users associated with the user-generated content, in accordance with one or more aspects of the present disclosure.

FIG. 4 is a flow diagram illustrating example operations of a computing system that is configured to implement techniques for detecting magnitudes of trends in user-generated content and facilitating the delivery of targeted content based at least in part on demographic data of the one or more users associated with the user-generated content, in accordance with one or more aspects of the present disclosure. For purposes of illustration only, the example operations are described below within the context of information distribution system 112, as shown in FIGS. 1 and 2.

As shown in FIG. 4, information distribution system 112 may receive and process a stream of messages composed by one or more users of the one or more client devices (400). In the example of FIG. 4 one or more of the messages may include a particular hashtag. For instance, as described in FIG. 1, users of one or more client devices may share, re-share, and/or read messages that include user content. The client devices may send the messages to information distribution system 112 for further processing in accordance with techniques of the disclosure. For instance, as described in FIG. 3, information distribution system 112 may extract, and in some instances, store data from the messages to determine one or more metrics.

Information distribution system 112 may determine, using the one or more metrics that are based at least in part on the messages, a trending score that represents a magnitude of a trend for the particular hashtag (402). For instance, as described in FIG. 3, information distribution system 112 may generate a feature vector that includes set of metrics that are usable to generate a trending score. Information distribution system may include a trend model, that has been trained with a training set of metrics and trending scores, that receives the feature vector. The trend model may generate a trending score that indicates a magnitude of a trend for the particular hashtag.

Information distribution system 112 may determine whether the trending score for the particular hashtag satisfies a threshold (404). If the trending score does not satisfy the threshold (406), information distribution system 112 continues to process the stream of messages that include one or more hashtags (400). If the trending score satisfies threshold (408), information distribution system 112 may select a set of demographic data that describes one or more users associated with the hashtag to one or more content provider systems (410). As described in FIG. 1, information distribution system 112 may aggregate, summarize, or divide the demographic data for users associated with the particular hashtag across any dimension, such as age, gender, geographic location, type of client device(s) of user, web browser/operating system of client device(s), history of content generated by the user, history of content read and/or followed by a user, hashtags and/or mention tags used by the user, to name only a few examples.

Using the data received from information distribution system 112, a content provider of a content provider system that receives the demographic data may generate or otherwise select targeted content for users associated with the particular hashtag. In this way, a content provider of a content provider system may use the demographic data to tailor targeted content to the audience described by the demographic data. The content provider may provide one or more user inputs to the content provider system to send the targeted content to information distribution system 112. Information distribution system may receive the targeted content from the content provider system (412). Upon receiving the targeted content, information distribution system 112 may determine one or more users that are associated with the particular hashtag. For the one or more users associated with the particular hashtag, information distribution system 112 may send the targeted content to the client devices of the one or more users (414). The client devices may output the targeted content for display, such that one or more users of the one or more client devices are able to view the targeted content.

Figure 5:
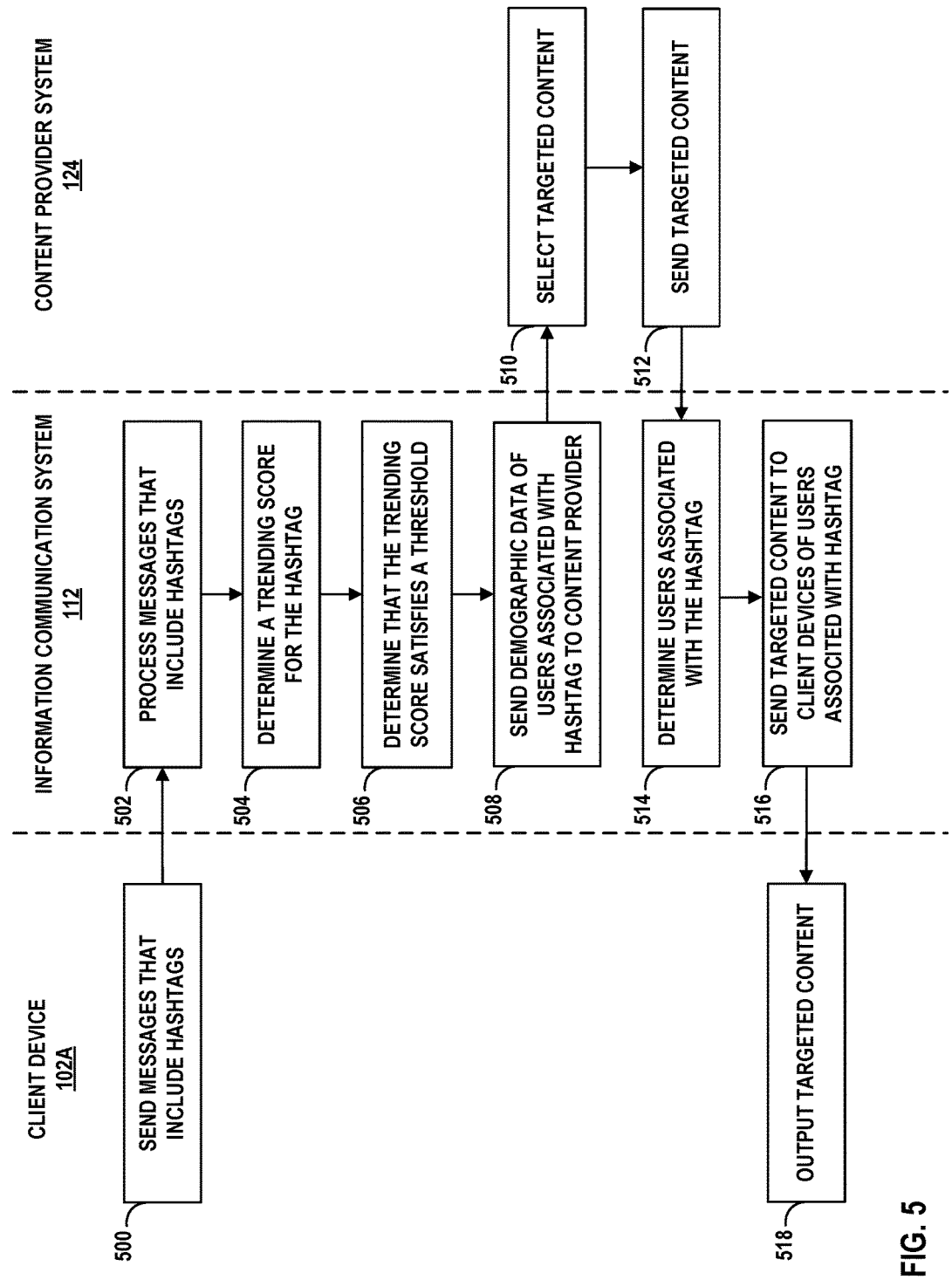
FIG. 5 is a flow diagram illustrating example operations of an information distribution system, a client device, and a content provider system, in accordance with one or more aspects of the present disclosure.

FIG. 5 is a flow diagram illustrating example operations of an information distribution system, a client device, and a content provider system, in accordance with one or more aspects of the present disclosure. For purposes of illustration only, the example operations are described below within the context of information distribution system 112, client device 102A, and content provider system 124, as shown in FIGS. 1 and 2.

As shown in FIG. 5 one or more client devices, such as client device 102A may send messages that include user content as described in FIG. 1 (500). For instance, a user may share or re-share a message, and client device 102A may send a message that includes user content or data to re-share the message. In some examples, the message may include one or more hashtags. Information communication system 112 may receive and process the message from client device 102A and process the message (502). As part of processing the message, information distribution system 112 may extract and store data from the messages to determine one or more metrics. For example, information distribution system 112 may generate one or more metrics as described in FIG. 3, such as velocity, acceleration, and nodality for the hashtag, to name only a few examples.

Information distribution system 112 may determine, using the one or more metrics that are based at least in part on the messages, a trending score that represents a magnitude of a trend for the particular hashtag (504). For instance, information distribution system 112 may generate a set of metrics that are usable to generate a trending score. Information distribution system 112 may apply the set of metrics to a trend model. The trend model may generate a trending score that indicates a magnitude of a trend for the particular hashtag. Information distribution system 112 may determine that the trending score satisfies a threshold (506). In some examples, the trending score may satisfy the threshold when the score is greater than or equal to the threshold. In some examples, the trending score may satisfy the threshold when the score is less than or equal to the threshold. In some examples, the trending score may satisfy the threshold when the score is equal to the threshold.

Information distribution system 112, in response to determining that the trending score satisfies the threshold, may select a set of demographic data that describes one or more users associated with the hashtag to one or more content provider systems and send the demographic data to one or more content provider systems (508). Information distribution system 112 may aggregate, summarize, or divide the demographic data for users associated with the particular hashtag across any one or more dimensions. Content provider system 124 may receive the demographic data. In some examples, the content provider may generate or otherwise select targeted content for users associated with the particular hashtag (510). In this way, a content provider of content provider system 124 may select targeted content to the audience described by the demographic data. Content provider system 124 may send the targeted content to information communication system 112 (512). In some examples, as described in FIG. 1, content provider system may also send a bid or price that the content provider is willing to pay the operator of the information communication system 112, if the targeted content is sent for display at client devices of one or more users associated with the particular hashtag.

Information distribution system 112 may determine a set of users that are associated with the particular hashtag, in order to send the targeted content to one or more computing devices associated with the one or more users (514). Upon determining the user, information distribution system 112 may send the targeted content to the one or more computing devices associated with the one or more users (516). The client devices, such as client device 102A, may receive the targeted content, and output the targeted content for display (518).

Example 1

A method comprising: receiving, by an information distribution system and from one or more client devices, a stream of messages composed by one or more users of the one or more client devices, wherein each of the messages includes a particular hashtag; determining, by the information distribution system and using a set of metrics that are based at least in part on the messages, a trending score that represents a magnitude of a trend for the particular hashtag; in response to determining that the trending score satisfies a threshold, sending, by the information distribution system and to a content provider system, a set of demographic data that describes one or more of the users who associated with the particular hashtag; and in response to receiving, from the content provider system, targeted content that is based at least in part on the particular hashtag and the set of demographic data, sending, by the information distribution system and for display at the one or more of the one or more client devices, the targeted content.

Example 2

The method of example 1, further comprising: determining, by the information distribution system, a count of the messages distributed by the one or more users over a period of time; and determining, by the information distribution system and based at least in part on the count of the messages, a rate of messages distributed per unit of time during the period of time, wherein the set of metrics includes a velocity metric that represents the rate of messages distributed period per unit of time during the period of time.

Example 3

The method of example 2, further comprising: determining, by the information distribution system, a rate of change in the rate of messages distributed per unit of time during the period of time, wherein the set of metrics includes an acceleration metric that represents the rate of change in the rate of messages distributed per unit of time during the period of time.

Example 4

The method of any of examples 1-3, further comprising: determining, by the information distribution system, a set of other messages associated with the particular hashtag; determining, by the information distribution system, a set of users associated with the set of other messages; for each respective user of the set of users, determining, by the information distribution system, a respective count of other users that are followers of content distributed by the respective user; and determining, by the information distribution system, a total count of other users that are followers based at least in part on each respective count of other users that are followers, wherein the set of metrics includes a nodality metric that represents the total count of other users that are followers.

Example 5

The method of any of examples 1-4, wherein the set of metrics comprises one or more of: a total number of users that have distributed messages associated with the particular hashtag, a first count of the messages associated with the particular hashtag that include media, a second count of the messages associated with the particular hashtag that include a link to a media source, or a count of users that are identified in the messages associated with the particular hashtag.

Example 6

The method of any of examples 1-5, further comprising: setting, by the information distribution system, the threshold based at least in part on one or more criteria, wherein the one or more criteria comprise at least of an industry, a time interval, a demographic dimension, or semantic content of one or more of the messages.

Example 7

The method of any of examples 1-6, further comprising: training, by the information distribution system and based at least in part on a set of training data, a trend model that generates trending scores that represent magnitudes of trends for particular hashtags; in response to receiving the messages composed by the one or more users of the one or more client devices, extracting, by the information distribution system, data from the messages; generating, by the information distribution system and based at least in part on the data from the stream of messages, the set of metrics; and inputting, by the information distribution system and to the trend model, the set of metrics, wherein determining the trending score that represents the magnitude of the trend further comprises, generating, by the information distribution system and based at least in part on the trend model, the trending score.

Example 8

The method of any of examples 1-7, further comprising: receiving, by the information distribution system and from the content provider system, a bid price for distributing the targeted content to the one or more users of the one or more client devices; and in response to determining that the bid price is a highest bid price in a set of bid prices, debiting, by the information distribution system, an account of the content provider based at least in part on the bid price, wherein sending the targeted content to one or more client devices is based at least in part on the determining that the bid price is the highest bid price in the set of bid prices.

Example 9

The method of any of examples 1-8, wherein the particular hashtag is a first hashtag, the method further comprising: selecting, by the information distribution system, semantic content from first and second messages in the messages, wherein the first message is associated with the first hashtag and the second message is associated with the second hashtag; determining, by the information distribution system, a degree of similarity between the semantic content included in the first and second messages; and in response to determining that the degree of similarity satisfies a threshold, determining, by the information distribution system, that the first hashtag corresponds to the second hashtag, wherein determining the trending score that represents the magnitude of the trend is based at least in part on the first hashtag and the second hashtag.

Example 10

The method of any of examples 1-10, further comprising: determining, by the information distribution system, a count of users that have at least viewed or selected the targeted content; and sending, by the information distribution system and to the content provider system, the count of users that have at least viewed or selected the targeted content.

Example 11

A non-transitory computer-readable storage medium storing instructions that, when executed, cause at least one processor of a computing device to: receive, from one or more client devices, a stream of messages composed by one or more users of the one or more client devices, wherein each of the messages includes a particular hashtag; determine, using a set of metrics that are based at least in part on the messages, a trending score that represents a magnitude of a trend for the particular hashtag; in response to determining that the trending score satisfies a threshold, send, to a content provider system, a set of demographic data that describes one or more of the users who associated with the particular hashtag; and in response to receiving, from the content provider system, targeted content that is based at least in part on the particular hashtag and the set of demographic data, send, for display at the one or more of the one or more client devices, the targeted content.

Example 12

The non-transitory computer-readable storage medium of example 11 storing instructions that, when executed, further cause the at least one processor to: determine a count of the messages distributed by the one or more users over a period of time; and determine, based at least in part on the count of the messages, a rate of messages distributed per unit of time during the period of time, wherein the set of metrics includes a velocity metric that represents the rate of messages distributed period per unit of time during the period of time.

Example 13

The non-transitory computer-readable storage medium of example 12 storing instructions that, when executed, further cause the at least one processor to: determine a rate of change in the rate of messages distributed per unit of time during the period of time, wherein the set of metrics further includes an acceleration metric that represents the rate of change in the rate of messages distributed per unit of time during the period of time.

Example 14

The non-transitory computer-readable storage medium of any of examples 11-13 storing instructions that, when executed, further cause the at least one processor to: determine a set of other messages associated with the particular hashtag; determine a set of users associated with the set of other messages; for each respective user of the set of users, determine a respective count of other users that are followers of content distributed by the respective user; and determine a total count of other users that are followers based at least in part on each respective count of other users that are followers, wherein the set of metrics includes a nodality metric that represents the total count of other users that are followers.

Example 15

The non-transitory computer-readable storage medium of any of examples 11-14 storing instructions that, when executed, further cause the at least one processor to: train, based at least in part on a set of training data, a trend model that generates trending scores that represent magnitudes of trends for particular hashtags; in response to receiving the messages composed by the one or more users of the one or more client devices, extract data from the stream of messages; generate, based at least in part on the data from the messages, the set of metrics; and input, to the trend model, the set of metrics, wherein the instructions that cause the at least one processor to determine the trending score that represents the magnitude of the trend comprise instructions that, when executed, cause the at least one processor to generate, based at least in part on the trend model, the trending score.

Example 16

The non-transitory computer-readable storage medium of any of examples 11-15 storing instructions that, when executed, further cause the at least one processor to: receive, from the content provider system, a bid price for distributing the targeted content to the one or more users of the one or more client devices; and in response to determining that the bid price is a highest bid price in a set of bid prices, debit an account of the content provider based at least in part on the bid price, wherein sending the targeted content to one or more client devices is based at least in part on the determining that the bid price is the highest bid price in the set of bid prices.

Example 17

The non-transitory computer-readable storage medium of any of examples 11-16, wherein the particular hashtag is a first hashtag, and wherein the non-transitory computer-readable storage medium is storing instructions that, when executed, further cause the at least one processor to: select semantic content from first and second messages in the messages, wherein the first message is associated with the first hashtag and the second message is associated with the second hashtag; determine a degree of similarity between the semantic content included in the first and second messages; and in response to determining that the degree of similarity satisfies a threshold, determine that the first hashtag corresponds to the second hashtag, wherein determining the trending score that represents the magnitude of the trend is based at least in part on the first hashtag and the second hashtag.

Example 18

The non-transitory computer-readable storage medium of any of examples 11-17 storing instructions that, when executed, further cause the at least one processor to: determine a count of users that have at least viewed or selected the targeted content; and send, to the content provider system, the count of users that have at least viewed or selected the targeted content.

Example 19

The non-transitory computer-readable storage medium of any of examples 11-18, wherein the set of metrics comprises one or more of: a total number of users that have distributed messages associated with the particular hashtag, a first count of the messages associated with the particular hashtag that include media, a second count of the messages associated with the particular hashtag that include a link to a media source, or a count of users that are identified in the messages associated with the particular hashtag.

Example 20

A computing device comprising: at least one processor; and at least one non-transitory computer-readable storage medium storing instructions that are executable by the at least one processor to: receive, from one or more client devices, a stream of messages composed by one or more users of the one or more client devices, wherein each of the messages includes a particular hashtag; determine, using a set of metrics that are based at least in part on the messages, a trending score that represents a magnitude of a trend for the particular hashtag; in response to determining that the trending score satisfies a threshold, send, to a content provider system, a set of demographic data that describes one or more of the users who associated with the particular hashtag; and in response to receiving, from the content provider system, targeted content that is based at least in part on the particular hashtag and the set of demographic data, send, for display at the one or more of the one or more client devices, the targeted content.

Example 21

The computing device of example 20, wherein the instructions are further executable by the at least one processor to: determine a count of the messages distributed by the one or more users over a period of time; and determine, based at least in part on the count of the messages, a rate of messages distributed per unit of time during the period of time, wherein the set of metrics includes a velocity metric that represents the rate of messages distributed period per unit of time during the period of time.

Example 22

The computing device of example 21, wherein the instructions are further executable by the at least one processor to: determine a rate of change in the rate of messages distributed per unit of time during the period of time, wherein the set of metrics further includes an acceleration metric that represents the rate of change in the rate of messages distributed per unit of time during the period of time.

Example 23

The computing device of any of examples 20-22, wherein the instructions are further executable by the at least one processor to: determine a set of other messages associated with the particular hashtag; determine a set of users associated with the set of other messages; for each respective user of the set of users, determine a respective count of other users that are followers of content distributed by the respective user; and determine a total count of other users that are followers based at least in part on each respective count of other users that are followers, wherein the set of metrics includes a nodality metric that represents the total count of other users that are followers.

Example 24

The computing device of any of examples 20-23, wherein the instructions are further executable by the at least one processor to: train, based at least in part on a set of training data, a trend model that generates trending scores that represent magnitudes of trends for particular hashtags; in response to receiving the messages composed by the one or more users of the one or more client devices, extract data from the messages; generate, based at least in part on the data from the messages, the set of metrics; and input, to the trend model, the set of metrics, wherein the instructions that cause the at least one processor to determine the trending score that represents the magnitude of the trend comprise instructions that, when executed, cause the at least one processor to generate, based at least in part on the trend model, the trending score.

Example 25

The computing device of any of examples 20-24, wherein the instructions are further executable by the at least one processor to: receive, from the content provider system, a bid price for distributing the targeted content to the one or more users of the one or more client devices; and in response to determining that the bid price is a highest bid price in a set of bid prices, debit an account of the content provider based at least in part on the bid price, wherein sending the targeted content to one or more client devices is based at least in part on the determining that the bid price is the highest bid price in the set of bid prices.

Example 26

The computing device of any of examples 20-25, wherein the particular hashtag is a first hashtag, and wherein the instructions are further executable by the at least one processor to: select semantic content from first and second messages in the stream of messages, wherein the first message is associated with the first hashtag and the second message is associated with the second hashtag; determine a degree of similarity between the semantic content included in the first and second messages; and in response to determining that the degree of similarity satisfies a threshold, determine that the first hashtag corresponds to the second hashtag, wherein determining the trending score that represents the magnitude of the trend is based at least in part on the first hashtag and the second hashtag.

Example 27

The computing device of any of examples 20-26, wherein the instructions are further executable by the at least one processor to: determine a count of users that have at least viewed or selected the targeted content; and send, to the content provider system, the count of users that have at least viewed or selected the targeted content.

Example 28

A device comprising means for performing the method of any of examples 1-11.

Example 29

A non-transitory computer-readable storage medium storing instructions that, when executed, cause at least one processor to perform the method of any of examples 1-11.

Example 30

A device comprising at least one module operable by one or more processors to perform the method of any of examples 1-11.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium includes a non-transitory medium. In some examples, the term "non-transitory" indicates that the storage medium is not embodied in a carrier wave or a propagated signal. In certain examples, a non-transitory storage medium may store data that can, over time, change (e.g., in RAM or cache). Although certain examples are described as outputting various information for display, techniques of the disclosure may output such information in other forms, such as audio, holographical, or haptic forms, to name only a few examples, in accordance with techniques of the disclosure.

Various examples have been described. These and other examples are within the scope of the following claims.

What is claimed is:

1. A method comprising:
   receiving, by an information distribution system and from one or more client devices, a first plurality of messages composed by one or more users of the one or more client devices, wherein each of the messages in the first plurality of messages includes a first hashtag, and wherein a first message of the first plurality of messages includes first semantic content;
   receiving, by the information distribution system and from a second client device, a second message composed by one or more users of the second client device, wherein the second message includes a second hashtag and second semantic content, and wherein the second message does not include the first hashtag;
   determining, by the information distribution system, a degree of similarity between the first semantic content included in the first message and the second semantic content of the second message;
   in response to determining that the degree of similarity satisfies a similarity threshold, determining, by the information distribution system, that the first hashtag corresponds to the second hashtag;
   in response to determining that the first hashtag corresponds to the second hashtag, forming, by the information distribution system, a second plurality of messages that includes the first plurality of messages and the second message;
   determining, by the information distribution system and using a set of metrics that are based at least in part on the second plurality of messages, a trending score that represents a magnitude of a trend for the first hashtag and the second hashtag;
   in response to determining that the trending score satisfies a threshold, sending, by the information distribution system and to a content provider system, a set of demographic data that describes one or more of the users who associated with the first hashtag or the second hashtag; and
   in response to receiving, from the content provider system, targeted content that is based at least in part on the first hashtag, on the second hashtag, and on the set of demographic data, sending, by the information distribution system and for display at one or more of the one or more client devices or the second client device, the targeted content.

2. The method of claim 1, further comprising:
   determining, by the information distribution system, a count of the second plurality of messages distributed by the one or more users over a period of time; and
   determining, by the information distribution system and based at least in part on the count of the second plurality of messages, a rate of messages distributed per unit of time during the period of time,
   wherein the set of metrics includes a velocity metric that represents the rate of messages distributed period per unit of time during the period of time.

3. The method of claim 2, further comprising:
   determining, by the information distribution system, a rate of change in the rate of messages distributed per unit of time during the period of time,
   wherein the set of metrics includes an acceleration metric that represents the rate of change in the rate of messages distributed per unit of time during the period of time.

4. The method of claim 1, further comprising:
   determining, by the information distribution system, a set of other messages associated with the first hashtag;
   determining, by the information distribution system, a set of users associated with the set of other messages;
   for each respective user of the set of users, determining, by the information distribution system, a respective count of other users that are followers of content distributed by the respective user; and
   determining, by the information distribution system, a total count of other users that are followers based at least in part on each respective count of other users that are followers,
   wherein the set of metrics includes a nodality metric that represents the total count of other users that are followers.

5. The method of claim 1, wherein the set of metrics comprises one or more of:
   a total number of users that have distributed messages associated with the first hashtag,
   a first count of the first plurality of messages associated with the first hashtag that include media,
   a second count of the first plurality of messages associated with the first hashtag that include a link to a media source, or
   a count of users that are identified in the first plurality of messages associated with the first hashtag.

6. The method of claim 1, further comprising:
   setting, by the information distribution system, the threshold based at least in part on one or more criteria, wherein the one or more criteria comprise at least of an industry, a time interval, a demographic dimension, or semantic content of one or more of the second plurality of messages.

7. The method of claim 1, further comprising:
   training, by the information distribution system and based at least in part on a set of training data, a trend model that generates trending scores that represent magnitudes of trends for particular hashtags;
   in response to receiving the second plurality of messages composed by the one or more users of the one or more client devices, extracting, by the information distribution system, data from the second plurality of messages;
   generating, by the information distribution system and based at least in part on the data from the second plurality of messages, the set of metrics; and
   inputting, by the information distribution system and to the trend model, the set of metrics,
   wherein determining the trending score that represents the magnitude of the trend further comprises, generating, by the information distribution system and based at least in part on the trend model, the trending score.

8. The method of claim 1, further comprising:
   receiving, by the information distribution system and from the content provider system, a bid price for distributing the targeted content to the one or more users of the one or more client devices; and
   in response to determining that the bid price is a highest bid price in a set of bid prices, debiting, by the information distribution system, an account of the content provider based at least in part on the bid price,
   wherein sending the targeted content to the one or more client devices is based at least in part on the determining that the bid price is the highest bid price in the set of bid prices.

9. The method of claim 1, further comprising:
   determining, by the information distribution system, a count of users that have at least viewed or selected the targeted content; and
   sending, by the information distribution system and to the content provider system, the count of users that have at least viewed or selected the targeted content.

10. A non-transitory computer-readable storage medium storing instructions that, when executed, cause at least one processor to:
   receive, from one or more client devices, a first plurality of messages composed by one or more users of the one or more client devices, wherein each of the messages in the first plurality of messages includes a first hashtag, and wherein a first message of the first plurality of messages includes first semantic content;
   receive, from a second client device, a second message composed by one or more users of the second client device, wherein the second message includes a second hashtag and second semantic content, and wherein the second message does not include the first hashtag;
   determine a degree of similarity between the first semantic content included in the first message and the second semantic content of the second message;
   in response to determining that the degree of similarity satisfies a similarity threshold, determine that the first hashtag corresponds to the second hashtag;
   in response to determining that the first hashtag corresponds to the second hashtag, form a second plurality of messages that includes the first plurality of messages and the second message;
   determine, using a set of metrics that are based at least in part on the second plurality of messages, a trending score that represents a magnitude of a trend for the first hashtag and the second hashtag;
   in response to determining that the trending score satisfies a threshold, send, to a content provider system, a set of demographic data that describes one or more of the users who associated with the first hashtag or the second hashtag; and
   in response to receiving, from the content provider system, targeted content that is based at least in part on the first hashtag, on the second hashtag, and on the set of demographic data, send, for display at one or more of the one or more client devices or the second client device, the targeted content.

11. The non-transitory computer-readable storage medium of claim 10 storing instructions that, when executed, further cause the at least one processor to:
  determine a count of the second plurality of messages distributed by the one or more users over a period of time; and
  determine, based at least in part on the count of the second plurality of messages, a rate of messages distributed per unit of time during the period of time,
  wherein the set of metrics includes a velocity metric that represents the rate of messages distributed period per unit of time during the period of time.

12. The non-transitory computer-readable storage medium of claim 11 storing instructions that, when executed, further cause the at least one processor to:
  determine a rate of change in the rate of messages distributed per unit of time during the period of time,
  wherein the set of metrics further includes an acceleration metric that represents the rate of change in the rate of messages distributed per unit of time during the period of time.

13. The non-transitory computer-readable storage medium of claim 10 storing instructions that, when executed, further cause the at least one processor to:
  determine a set of other messages associated with the first hashtag;
  determine a set of users associated with the set of other messages;
  for each respective user of the set of users, determine a respective count of other users that are followers of content distributed by the respective user; and
  determine a total count of other users that are followers based at least in part on each respective count of other users that are followers,
  wherein the set of metrics includes a nodality metric that represents the total count of other users that are followers.

14. The non-transitory computer-readable storage medium of claim 10 storing instructions that, when executed, further cause the at least one processor to:
  train, based at least in part on a set of training data, a trend model that generates trending scores that represent magnitudes of trends for particular hashtags;
  in response to receiving the second plurality of messages composed by the one or more users of the one or more client devices, extract data from the second plurality of messages;
  generate, based at least in part on the data from the second plurality of messages, the set of metrics; and
  input, to the trend model, the set of metrics,
  wherein the instructions that cause the at least one processor to determine the trending score that represents the magnitude of the trend comprise instructions that, when executed, cause the at least one processor to generate, based at least in part on the trend model, the trending score.

15. The non-transitory computer-readable storage medium of claim 10 storing instructions that, when executed, further cause the at least one processor to:
  receive, from the content provider system, a bid price for distributing the targeted content to the one or more users of the one or more client devices; and
  in response to determining that the bid price is a highest bid price in a set of bid prices, debit an account of the content provider based at least in part on the bid price, wherein sending the targeted content to one or more client devices is based at least in part on the determining that the bid price is the highest bid price in the set of bid prices.

16. The non-transitory computer-readable storage medium of claim 10 storing instructions that, when executed, further cause the at least one processor to:
  determine a count of users that have at least viewed or selected the targeted content; and
  send, to the content provider system, the count of users that have at least viewed or selected the targeted content.

17. A computing device comprising:
  at least one processor; and
  at least one non-transitory computer-readable storage medium storing instructions that are executable by the at least one processor to:
    receive, from one or more client devices, a first plurality of messages composed by one or more users of the one or more client devices, wherein each of the messages in the first plurality of messages includes a first hashtag, and wherein a first message of the first plurality of messages includes first semantic content;
    receive, from a second client device, a second message composed by one or more users of the second client device, wherein the second message includes a second hashtag and second semantic content, and wherein the second message does not include the first hashtag;
    determine a degree of similarity between the first semantic content included in the first message and the second semantic content of the second message;
    in response to determining that the degree of similarity satisfies a similarity threshold, determine that the first hashtag corresponds to the second hashtag;
    in response to determining that the first hashtag corresponds to the second hashtag, form a second plurality of messages that includes the first plurality of messages and the second message;
    determine, using a set of metrics that are based at least in part on the second plurality of messages, a trending score that represents a magnitude of a trend for the first hashtag and the second hashtag;
    in response to determining that the trending score satisfies a threshold, send, to a content provider system, a set of demographic data that describes one or more of the users who associated with the first hashtag or the second hashtag; and
    in response to receiving, from the content provider system, targeted content that is based at least in part on the first hashtag, on the second hashtag, and on the set of demographic data, send, for display at one or more of the one or more client devices or the second client device, the targeted content.

18. The computing device of claim 17, wherein the instructions are further executable by the at least one processor to:
  determine a count of the first plurality of messages distributed by the one or more users over a period of time; and
  determine, based at least in part on the count of the second plurality of messages, a rate of messages distributed per unit of time during the period of time,
  wherein the set of metrics includes a velocity metric that represents the rate of messages distributed period per unit of time during the period of time.

19. The computing device of claim 18, wherein the instructions are further executable by the at least one processor to:
    determine a rate of change in the rate of messages distributed per unit of time during the period of time,
    wherein the set of metrics further includes an acceleration metric that represents the rate of change in the rate of messages distributed per unit of time during the period of time.

20. The computing device of claim 17, wherein the instructions are further executable by the at least one processor to:
    determine a set of other messages associated with the first hashtag;
    determine a set of users associated with the set of other messages;
    for each respective user of the set of users, determine a respective count of other users that are followers of content distributed by the respective user; and
    determine a total count of other users that are followers based at least in part on each respective count of other users that are followers,
    wherein the set of metrics includes a nodality metric that represents the total count of other users that are followers.

21. The computing device of claim 17, wherein the instructions are further executable by the at least one processor to:
    train, based at least in part on a set of training data, a trend model that generates trending scores that represent magnitudes of trends for particular hashtags;
    in response to receiving the second plurality of messages composed by the one or more users of the one or more client devices, extract data from the second plurality of messages;
    generate, based at least in part on the data from the second plurality of messages, the set of metrics; and
    input, to the trend model, the set of metrics,
    wherein the instructions that cause the at least one processor to determine the trending score that represents the magnitude of the trend comprise instructions that, when executed, cause the at least one processor to generate, based at least in part on the trend model, the trending score.

22. The computing device of claim 17, wherein the instructions are further executable by the at least one processor to:
    receive, from the content provider system, a bid price for distributing the targeted content to the one or more users of the one or more client devices; and
    in response to determining that the bid price is a highest bid price in a set of bid prices, debit an account of the content provider based at least in part on the bid price,
    wherein sending the targeted content to one or more client devices is based at least in part on the determining that the bid price is the highest bid price in the set of bid prices.

23. The computing device of claim 17, wherein the instructions are further executable by the at least one processor to:
    determine a count of users that have at least viewed or selected the targeted content; and
    send, to the content provider system, the count of users that have at least viewed or selected the targeted content.

* * * * *